(12) United States Patent
Inoke et al.

(10) Patent No.: US 7,576,728 B2
(45) Date of Patent: Aug. 18, 2009

(54) APPARATUS FOR GENERATING MESH DATA, COMPUTER-READABLE RECORDING MEDIUM IN WHICH MESH DATA GENERATING PROGRAM IS STORED, METHOD FOR GENERATING MESH DATA, STRUCTURAL ANALYSIS APPARATUS, COMPUTER-READABLE RECORDING MEDIUM IN WHICH STRUCTURAL ANALYSIS PROGRAM IS STORED, AND METHOD FOR STRUCTURAL ANALYSIS

(75) Inventors: Misao Inoke, Kawasaki (JP); Rikako Shinomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 11/108,860

(22) Filed: Apr. 19, 2005

(65) Prior Publication Data
US 2006/0152505 A1 Jul. 13, 2006

(30) Foreign Application Priority Data
Dec. 21, 2004 (JP) ............................. 2004-369063

(51) Int. Cl.
G06F 3/33 (2006.01)
(52) U.S. Cl. ...................................... 345/158; 345/157
(58) Field of Classification Search .................... 345/1, 345/2, 156–158, 168, 169, 173, 174, 184, 345/419–425, 473, 501–503, 903, 474, 646; 382/103, 107; 703/2, 13, 1; 439/115; 707/100; 716/20; 702/65
See application file for complete search history.

(56) References Cited

U.S. PATENT DOCUMENTS

| | | | | |
|---|---|---|---|---|
| 5,067,160 A * | 11/1991 | Omata et al. | ................ | 382/107 |
| 5,096,429 A * | 3/1992 | Fraser | ......................... | 439/115 |
| 5,436,735 A * | 7/1995 | Tanabe et al. | ................ | 358/453 |
| 5,768,156 A * | 6/1998 | Tautges et al. | ................. | 716/20 |
| 5,819,070 A * | 10/1998 | Sasaki | .......................... | 703/13 |
| 5,874,946 A * | 2/1999 | Nishijima et al. | ............ | 345/169 |
| 5,946,479 A * | 8/1999 | Sakaguchi et al. | ............. | 716/20 |
| 6,243,074 B1 * | 6/2001 | Fishkin et al. | ............... | 345/156 |
| 6,243,075 B1 * | 6/2001 | Fishkin et al. | ............... | 345/156 |
| 6,297,805 B1 * | 10/2001 | Adler et al. | .................. | 345/158 |

(Continued)

FOREIGN PATENT DOCUMENTS

JP 6-331506 12/1994

Primary Examiner—Prabodh M. Dharia
(74) Attorney, Agent, or Firm—Westerman, Hattori, Daniels & Adrian, LLP.

(57) ABSTRACT

In order to efficiently generate mesh data to be used for application of structural analysis to an object formed by uniting a plurality of elements in which data elements are automatically connected without manual operation, an apparatus for generating mesh data includes an edge extracting section for extracting, on the basis of the three-dimensional design data, a pair of edges corresponding to a connection at which two elements are connected to each other when the object is formed; a mesh data generating section for generating, on the basis of the three-dimensional design data, mesh data concerning each of the plural elements; a node extracting section for extracting nodes corresponding one to each of the pair of edges extracted by the edge extracting section from the mesh data; and a node connecting section for connecting the nodes of the pair of edges to each other.

16 Claims, 22 Drawing Sheets

U.S. PATENT DOCUMENTS

| | | | |
|---|---|---|---|
| 6,766,261 B2 * | 7/2004 | Nishino et al. | 702/65 |
| 6,919,892 B1 * | 7/2005 | Cheiky et al. | 345/473 |
| 7,027,054 B1 * | 4/2006 | Cheiky et al. | 345/473 |
| 7,038,700 B2 * | 5/2006 | Kawaguchi et al. | 345/646 |
| 7,079,114 B1 * | 7/2006 | Smith et al. | 345/158 |
| 7,089,089 B2 * | 8/2006 | Cumming et al. | 700/295 |
| 2001/0000963 A1 * | 5/2001 | Deguchi | 345/420 |
| 2001/0026278 A1 * | 10/2001 | Arai et al. | 345/474 |
| 2002/0075259 A1 * | 6/2002 | Sakamoto et al. | 345/419 |
| 2002/0075456 A1 * | 6/2002 | Shiratani | 353/31 |
| 2002/0140435 A1 * | 10/2002 | Nishino et al. | 324/627 |
| 2003/0016216 A1 * | 1/2003 | Hariya et al. | 345/420 |
| 2003/0058259 A1 * | 3/2003 | Kawaguchi et al. | 345/646 |
| 2003/0229476 A1 * | 12/2003 | Naganarayana et al. | 703/1 |
| 2004/0162839 A1 * | 8/2004 | Udeshi et al. | 707/100 |
| 2004/0240543 A1 * | 12/2004 | Faroudja | 375/240.01 |
| 2004/0240709 A1 * | 12/2004 | Shoemaker | 382/103 |
| 2005/0021318 A1 * | 1/2005 | Inoue et al. | 703/2 |
| 2005/0055183 A1 * | 3/2005 | Tani et al. | 703/2 |
| 2005/0171745 A1 * | 8/2005 | Breitfeld et al. | 703/2 |
| 2005/0234687 A1 * | 10/2005 | Sakairi et al. | 703/2 |

* cited by examiner

FIG. 3

| EDGE PAIR NUMBER | POSITION ON COORDINATE | | | HOLE DIAMETER (r) | POSITION ON COORDINATE | | | HOLE DIAMETER (r) |
|---|---|---|---|---|---|---|---|---|
| | X | Y | Z | | X | Y | Z | |
| 1 | 10.5 | -3.5 | 3.6 | 1.5 | 10.5 | -3.5 | -1.0 | 1.5 |
| 2 | 20.5 | -3.5 | 3.6 | 1.5 | 20.5 | -3.5 | -1.0 | 1.5 |
| 3 | 30.5 | -3.5 | 3.6 | 1.0 | 30.5 | -3.5 | -1.0 | 1.0 |
| ... | ... | ... | ... | ... | ... | ... | ... | ... |

(UNIT:mm)

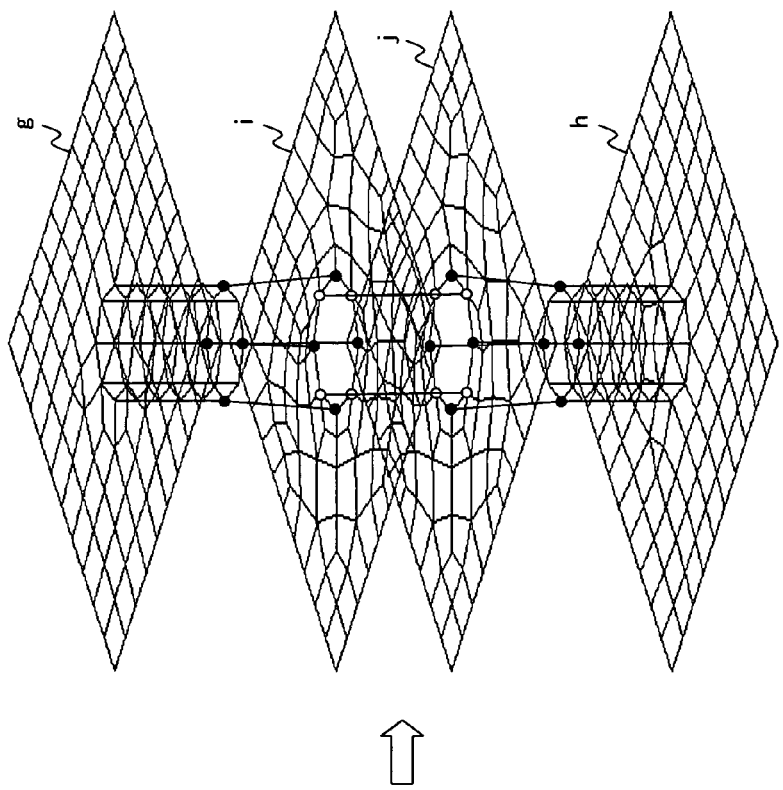
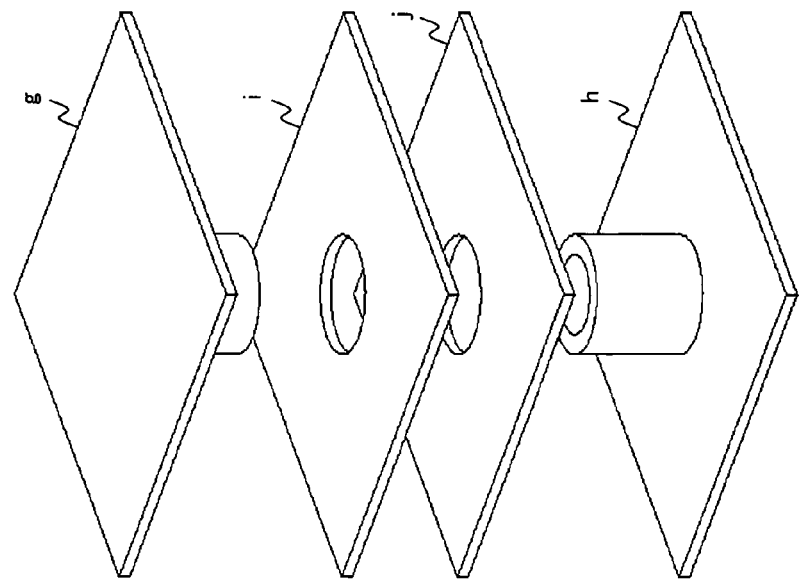

APPARATUS FOR GENERATING MESH DATA, COMPUTER-READABLE RECORDING MEDIUM IN WHICH MESH DATA GENERATING PROGRAM IS STORED, METHOD FOR GENERATING MESH DATA, STRUCTURAL ANALYSIS APPARATUS, COMPUTER-READABLE RECORDING MEDIUM IN WHICH STRUCTURAL ANALYSIS PROGRAM IS STORED, AND METHOD FOR STRUCTURAL ANALYSIS

BACKGROUND OF THE INVENTION

1. Field of the Invention

The present invention relates to structural analysis for an object that is formed by uniting a number of elements, and more particularly to generation of mesh data that is to be used for the structural analysis.

2. Description of the Related Art

Generally, finite element method has been widely applied to structural analysis, such as deformation analysis or residual vibration analysis, of an object formed by uniting a number of elements by means of screws and/or welding (for example, see Japanese Patent Application Laid-Open (KOKAI) No. HEI 6-331506).

Finite element method is an approximate analysis method for analyzing deformation and stress on an object using mesh data representing the object. Therefore in order to carry out structural analysis by finite element method, there has been provided a structural analysis apparatus incorporating a tool (software or the like) for generating mesh data by means of CAD (Computer Aided Design) on the basis of design data of an object that is to be analyzed.

A conventional mesh data generating apparatus however automatically generates mesh data for each of a number of elements that contribute to rigidity of the object but does not generate mesh data for connectors, e.g. screws (fastening screw) and/or welding materials, that make connections between the elements for the reason to be described later. Elements that are actually connected at connections by screws or welding materials are not connected in the generated mesh data. As a solution, an operator compares the generated mesh data with the corresponding design data generated by means of CAD or the like and manually makes, for future structural analysis, connections (engagement) between the elements in the mesh data using a mouse or another devices.

For example, a case for a notebook PC or a server has over 20 elements that contribute to rigidity. A notebook PC case is formed principally by uniting a lower cover, a frame, a print board, a DVD (Digital Versatile Disk) unit, an FDD (Floppy™ Disk Drive) unit, a HDD (Hard Disk Drive) unit and an upper cover by means of screws or welding.

Here, description will now be made in relation to a connection manner for elements that unitedly form a notebook PC case which connection is carried out manually by an operator with reference to FIGS. 17-21. First of all, the operator displays three-dimensional CAD design data shown in FIG. 17 representing the notebook PC case P on a monitor or the like and displays also mesh data shown in FIG. 18, generated based on the three-dimensional design data, by superimposing on the three-dimensional design data shown in FIG. 17 or in parallel with the three-dimensional design data so that connections (engagements) on the mesh data are found.

Then the operator enlarges a found connection (part S in FIG. 18) in the mesh data as shown in FIG. 19(a); finds nodes v and v' corresponding to edges on each connection (engagement) between elements V and V' respectively shown in FIGS. 19(b) and 19(c); and connects the nodes v and v' of the elements V and V' that are to be connected to each other in a manner of MPC (Multi Point Constraint) using the mouse to thereby connect the elements V and V' to each other.

More specifically, if, for example, an upper element A and a lower element B shown in FIG. 20 each of which has a boss are connected to each other at a connection in the three-dimensional design data found in the above manner by a screw, nodes located on a connection at which one of the elements comes to closest to the other elements (here, a connection is the openings of the bosses of the elements (upper element A and lower element B) which bosses are facing to each other at the connection) which nodes are corresponding to edges at the connection in the mesh data as shown in FIG. 21 are selected and are MPC-connected. In this example, lines D make one-to-one connections between four nodes C on the upper element A and four nodes C on the lower element B.

FIGS. 20 and 21 extract only a connection from the enlarged mesh data as shown in FIG. 19(a) for visual convenience of the found connection. Actually, nodes corresponding to edges on the connection are found from the enlarged mesh data shown in FIG. 19(a) and the found nodes are connected to each other.

Further, in the same manner as the connecting manner performed on the notebook PC case P described with reference to FIGS. 17 to 21, mesh data concerning a server case Q is connected by enlarging the connection (here a part T in FIG. 22) on the monitor as shown in FIG. 23(a); finding nodes w and w' corresponding to edges of the connection on elements W and W' respectively as shown in FIGS. 23(b) and 23(c); and carrying out MPC connection on the nodes w and w' so that the elements W and W' are connected to each other.

A notebook PC case has approximately 100 connections by means of screws or welding, and a server case has as many as approximately 300 connections.

Manually connecting two elements at each of such a large number of connections forces an operator into a great deal of load and time.

In order to find nodes corresponding to edges at each connection in design data from mesh data, the operator has to enlarge the connection in the mesh data being displayed on the monitor, comparing to the design data. That results in defective workability and defective operating efficiency loaded on the operator.

As a solution, design data concerning connectors such as screws (fastening screws) or welding materials may be converted in mesh data, in other words, mesh data in which connections between elements are connected is automatically generated. For example, design data concerning a single screw is converted into mesh data, which has 2,000-4,000 meshes (mesh elements), so that conversion of screws into mesh data adds far more than 200,000 meshes to the mesh data concerning a notebook PC case or a server case because the cases have 100 or more connections.

As conducting structural analysis by finite element method, the ordinary upper limit of the number of meshes in mesh data corresponding to an object is considered to be 150,000 to 200,000 meshes due to performance of a computer that carries out structural analysis. It takes extremely long time to accomplish structural analysis applied to mesh data including an excessive number of meshes.

Therefore, a conventional technique does not practically generate mesh data in which elements are connected also by converting connectors exemplified by screws and/or welding materials into mesh data.

SUMMARY OF THE INVENTION

With the foregoing problems in view, the object of the present invention is to efficiently generate mesh data that is used for structural analysis (by such as finite element method) applied to an object formed by uniting a plurality of elements in which mesh data elements are automatically connected at connections without manual operation by an operator.

In order to attain the above object, as a first generic feature, there is provided an apparatus for generating mesh data comprising: a three-dimensional design data retaining section for retaining three-dimensional design data representing a structure of an object formed by uniting a plurality of elements; an edge extracting section for extracting, on the basis of the three-dimensional design data retained in the three-dimensional design data retaining section, a pair of edges which are included in two of the plural elements and which are corresponding to a connection at which the two elements are connected to each other when the object is formed; a mesh data generating section for generating, on the basis of the three-dimensional design data, mesh data concerning each of the plural elements which mesh data is used for application structural analysis to the object; a node extracting section for extracting nodes corresponding one to each of the pair of edges extracted by the edge extracting section from the mesh data generated by the mesh data generating section; and a node connecting section for connecting the nodes of the pair of edges to each other, which nodes are extracted by the node extracting section.

As a second generic feature, there is provided a computer-readable recording medium in which a program for generating mesh data of a structure of an object formed by uniting a plurality of elements is stored, wherein the program instructs a computer to function as: an edge extracting section for extracting, on the basis of three-dimensional design data representing the structure of the object, a pair of edges which are included in two of the plural elements and which are corresponding to a connection at which the two elements are connected to each other when the object is formed; a mesh data generating section for generating, on the basis of the three-dimensional design data, mesh data concerning each of the plural elements which mesh data is used for application structural analysis to the object; a node extracting section for extracting nodes corresponding each to one of the pair of edges extracted by the edge extracting section from the mesh data generated by the mesh data generating section; and a node connecting section for connecting the nodes of the pair of edges to each other, which nodes are extracted by the node extracting section.

As a third generic feature of the present invention, there is provided a method for generating mesh data comprising the steps of: (a) extracting, on the basis of three-dimensional design data representing a structure of an object formed by uniting a plurality of elements which design data is stored in a memory, a pair of edges which are included in two of the plural elements and which are corresponding to a connection at which the two elements are connected to each other when the object is formed; (b) generating, on the basis of the three-dimensional design data, mesh data concerning each of the plural elements which mesh data is used for application structural analysis to the object; (c) extracting nodes corresponding one to each of the pair of edges extracted in the step (a) of extracting the pair of edges from the mesh data generated in the step (b) of generating the mesh data; and (d) connecting the nodes of the pair of edges to each other, which nodes are extracted in the step (c) extracting the nodes.

As a fourth generic feature, there is provided an apparatus for analyzing a structure of an object formed by uniting a plurality of elements comprising: a three-dimensional design data retaining section for retaining three-dimensional design data representing the structure of the object; an edge extracting section for extracting, on the basis of the three-dimensional design data retained in the three-dimensional design data retaining section, a pair of edges which are included in two of the plural elements and which are corresponding to a connection at which the two elements are connected to each other when the object is formed; a mesh data generating section for generating, on the basis of the three-dimensional design data, mesh data concerning each of the plural elements; a node extracting section for extracting nodes corresponding one to each of the pair of edges extracted by the edge extracting section from the mesh data generated by the mesh data generating section; anode connecting section for connecting the nodes of the pair of edges to each other, which nodes are extracted by the node extracting section; and a structure analyzing section for applying structural analysis to the object using the mesh data in which the nodes are connected.

According to the first to fourth generic features, the present invention can generate mesh data that is used for application of structural analysis to an object formed by connecting a plurality of elements in which mesh data elements that are to be connected to each other are automatically connected without manual operation by an operator. Whereby the mesh data is generated with great efficiency.

Other objects and further features of the present invention will be apparent from the following detailed description when read in conjunction with the accompanying drawings.

BRIEF DESCRIPTION OF THE DRAWINGS

FIG. 3 is a table showing edge data retained in an edge data retaining section of the apparatus of FIG. 1;

FIG. 6(a) illustrates three-dimensional data and FIG. 6(b) illustrates corresponding mesh data;

FIG. 7(a) illustrates three-dimensional design data and FIG. 7(b) illustrates corresponding mesh data;

FIGS. 8(a) and 8(b) are diagrams illustrating an example of a connection pattern retained in a connection pattern retaining section of the apparatus of FIG. 1, and more particularly FIG. 8(a) illustrates three-dimensional design data and FIG. 8(b) illustrates corresponding mesh data;

FIG. 15(a) illustrates the entire element and FIG. 15 (b) illustrates an enlarged view of the connection of the element;

FIG. 19(a) illustrates an enlargement view of the mesh data shown in FIG. 18, FIG. 19(b) illustrates an enlargement view of one of the two elements and FIG. 19(c) illustrates an enlargement view of the other elements;

FIG. 23(a) illustrates an enlargement view of the mesh data shown in FIG. 22, FIG. 23(b) illustrates an enlargement view of one of the two elements and FIG. 23(c) illustrates an enlargement view of the other elements.

DESCRIPTION OF THE PREFERRED EMBODIMENTS

A preferred embodiment of the present invention will now be described with reference to the accompanying drawings.

(1) First Embodiment

Figure 1:
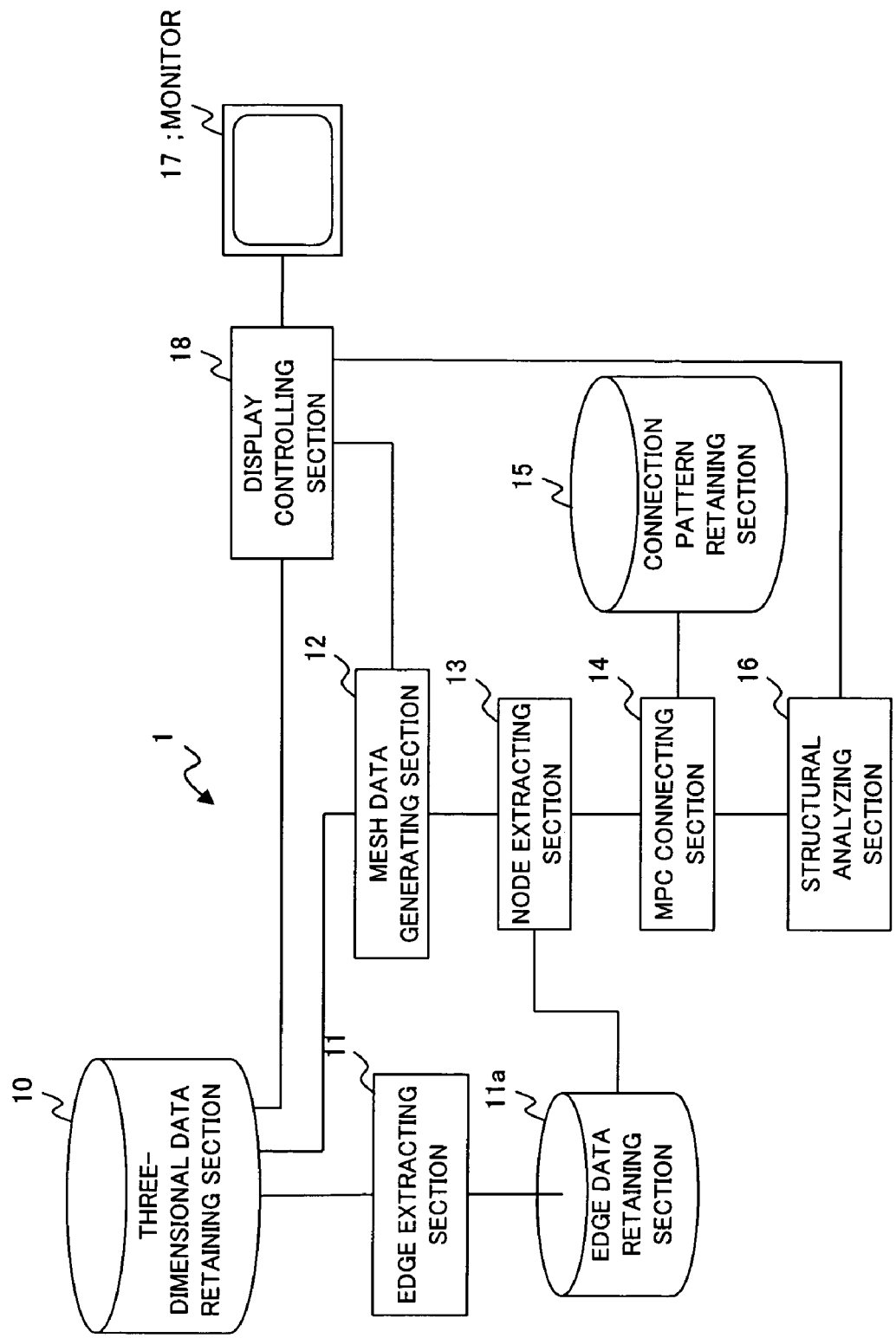
FIG. 1 is a block diagram schematically showing an apparatus for analyzing a structure of an object according to a first embodiment the present invention.

First of all, a first embodiment of the present invention will be now described with reference to block diagram FIG. 1. As shown in FIG. 1, a structural analysis apparatus 1 of the present invention applies structural analysis, in relation to stress, deformation or the like, to an object (hereinafter exemplified by a case P for a notebook PC) formed by uniting a number of elements by means of screw and welding. The structural analysis apparatus 1 includes a three-dimensional (hereinafter also called 3D) design data retaining section 10, an edge extracting section 11, an edge data retaining section 11a, a mesh data generating section 12, a node extracting section 13, an MPC (Multi Point Constraint) connecting section (node connecting section) 14, a connection pattern retaining section 15, a structural analyzing section 16, a monitor 17, and a display controlling section 18.

In the structural analysis apparatus 1, the 3D design data retaining section 10, the edge extracting section 11, the edge data retaining section 11a, the mesh data generating section 12, the node extracting section 13, the MPC connecting section 14, the connection pattern retaining section 15, the monitor 17 and the display controlling section 18 unitedly function as a mesh data generating apparatus of the present invention.

A memory serving as the 3D design data retaining section 10, the edge data retaining section 11a and/or the connection pattern retaining section 15 takes the form of, for example, a RAM (Random Access Memory) or a hard disk included in a PC functioning as the structural analysis apparatus 1 of the first embodiment.

The 3D design data retaining section 10 retains design data (CAD data) representing an object formed by uniting a number of elements which data is generated by means of CAD (Computer Aided Design) and, here, more particularly retains design data (hereinafter called 3D design data) depicted in three dimension.

The edge extracting section 11 extracts positions and shapes of a pair of edges, corresponding to connection at which two elements are connected to each other when the object is formed, from the two elements based on 3D design data retained in the 3D design data retaining section 10.

Here, connections, at each of which two elements are connected to each other, are different in terms of connection manners (e.g., kinds of screws or welding and shapes of each element) and means a portion at which the two elements make the closest approach on the contact point of the two elements.

Figure 2:
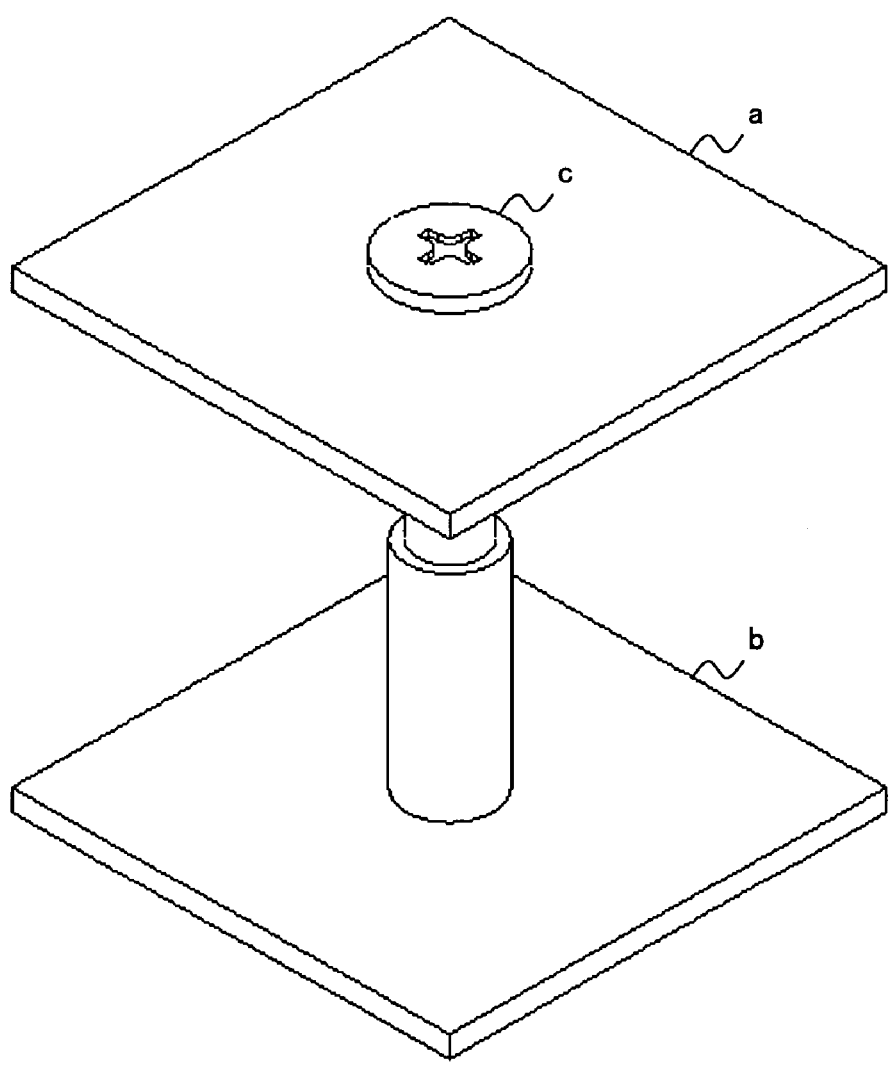
FIG. 2 is a diagram illustrating a connecting manner between two elements in three-dimensional design data retained in a three-dimensional design data retaining section of the apparatus of FIG. 1.

For example, as shown in FIG. 2, when a board-shape element a having a hole is connected to an element b having a boss by a screw c, the connections of the elements a and b correspond to the opening of the element a which opening makes the closest approach to the element b and the opening of the element b which opening makes the closest approach to the element a, respectively.

The 3D design data retained in the 3D design data retaining section 10 includes element numbers (identifications) which identifies individual screws (fasteners, hereinafter also called fastening screws) and/or welding materials which are used to connect the elements when the object is formed, in addition to data of the position and the size of each of the elements. Accordingly, the edge extracting section 11 extracts, from the 3D design data, information (edge data) concerning positions, shapes (diameters, length and/or the like), directions and the like of a pair of edges included in two elements which are to be connected to each other when the object is formed and thereby extracts the pair of edges.

The edge data retaining section 11a retains the edge data concerning positions, shapes (diameters, length and/or the like), directions and the like of the pair of edges which data is extracted by the edge extracting section 11. As shown in FIG. 3, the edge data is stored for every each pair of edges extracted by the edge extracting section 11 in the edge data retaining section 11a. In the example of FIG. 3, edges of each pair take the form of holes serving as a connection of corresponding two elements and, in this case, the edge extracting section 11 extracts a hole diameter as the shape of each edge.

The mesh data generating section 12 generates mesh data for each of the elements that are to be formed into the object based on the 3D design data retained in the 3D design data retaining section 10, which data is to be used for future application of structural analysis (in the illustrated example, analysis employing a finite element method) performed by the structural analyzing section 16 to the object.

The mesh data generating section 12 generates the mesh data such that each of a pair of edges corresponding to a connection between two elements is represented by a polygon having eight or more nodes but does not generate mesh data concerning connectors such as screws that connect elements.

Figure 4:
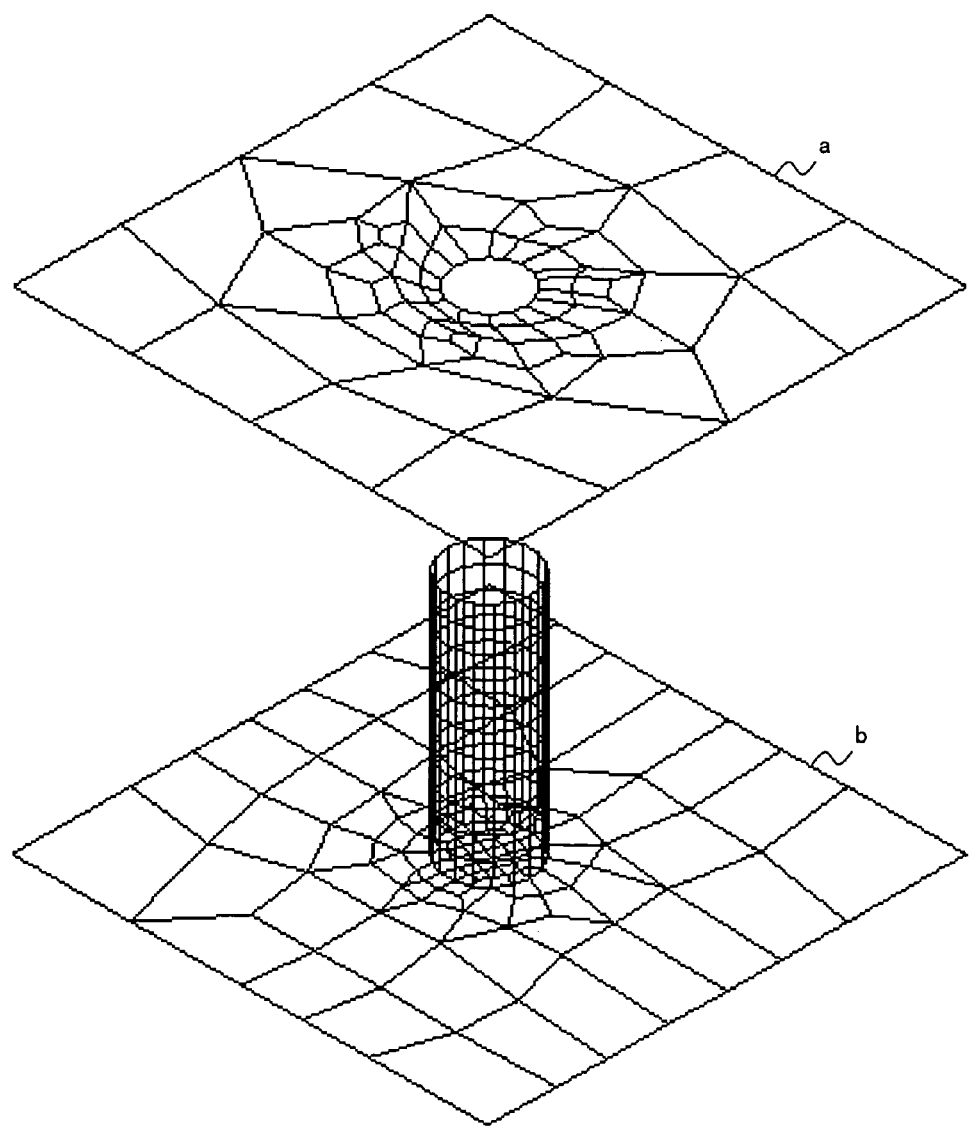
FIG. 4 is a diagram illustrating mesh data concerning two elements that is to be connected to each other shown in FIG. 2 which mesh data is generated by a mesh data generating section of the apparatus of FIG.

Specifically, for example, the mesh data generating section 12, as shown in FIG. 4, generates mesh data concerning the elements a and b illustrated in FIG. 2. Namely, mesh data concerning the screw c is not generated, and the mesh data generating section 12 generates mesh data represented by hexadodecagon having 16 nodes for the hole of the element a, which serves as one of the pair of edges corresponding to a connection, and mesh data represented by an icosagon having 20 nodes for the opening of the boss on the element b which opening serves as the other edge and matches the hole of the element a.

Figure 17:
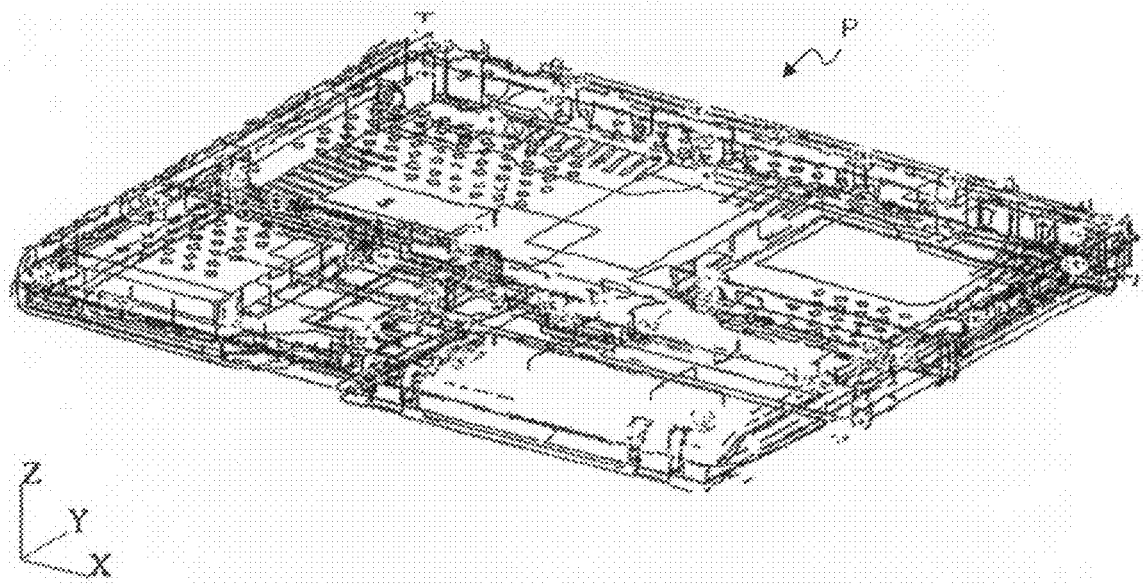
FIG. 17 is a diagram illustrating three-dimensional design data of a case for a notebook PC which data is generated on a CAD system.
Figure 18:
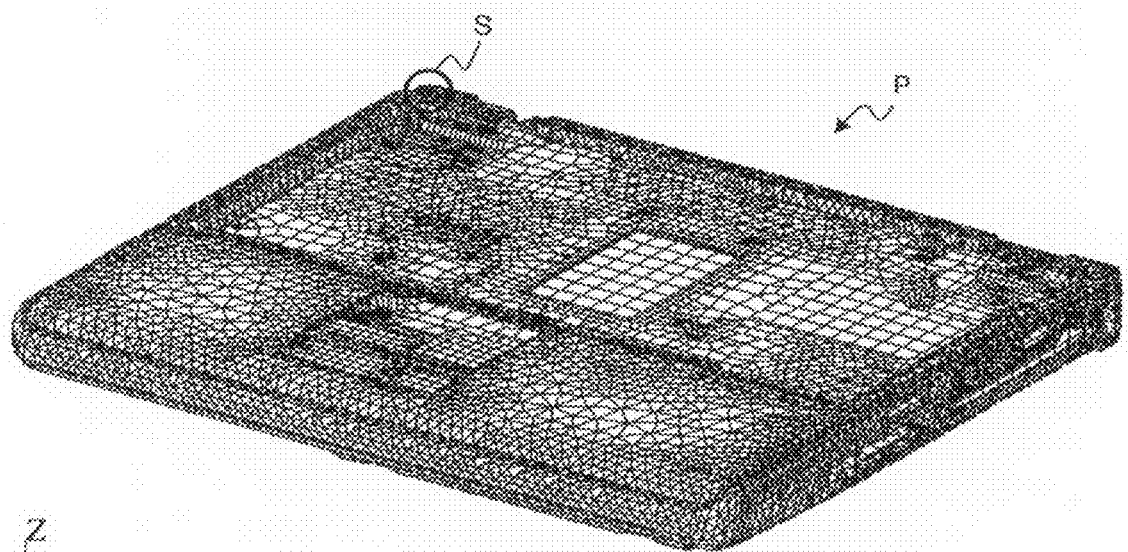
FIG. 18 is a diagram illustrating mesh data generated by converting the three-dimensional design data shown in FIG. 17.
Figure 19A:
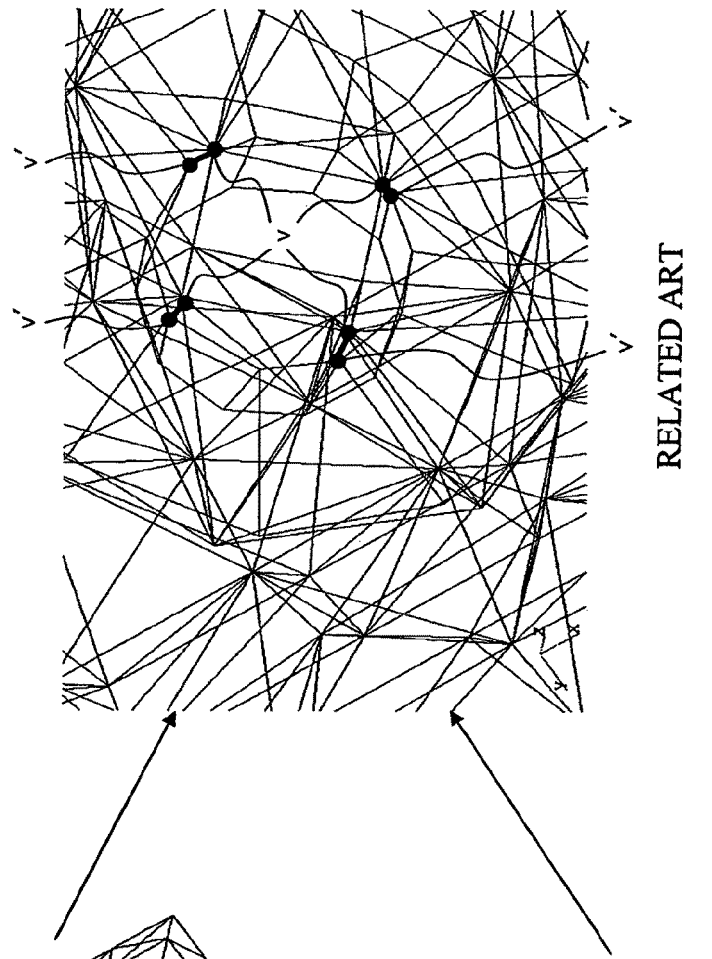
FIGS. 19(a), 19(b) and 19(c) are diagrams illustrating an enlargement of a connection in the mesh data shown in FIG. 18, at which connection two elements are connected, and more particularly
Figure 19B:
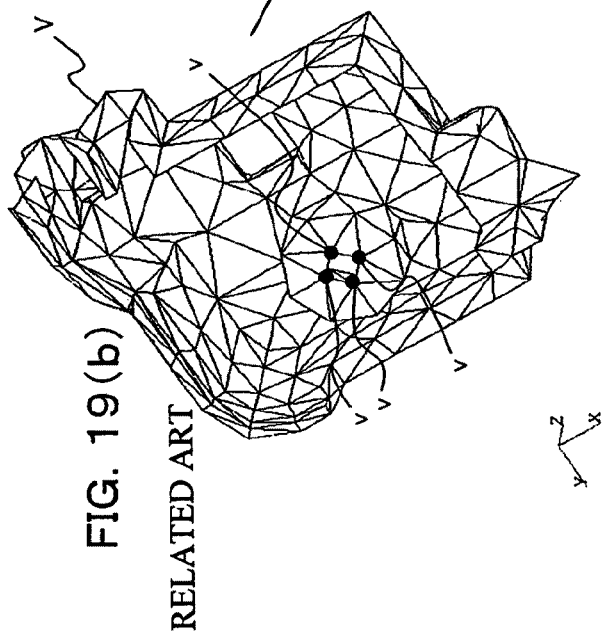
Figure 19C:
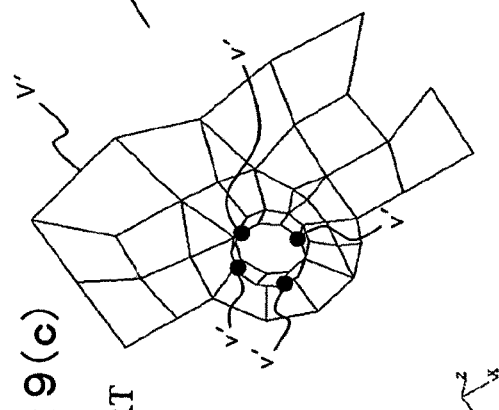
Figure 20:
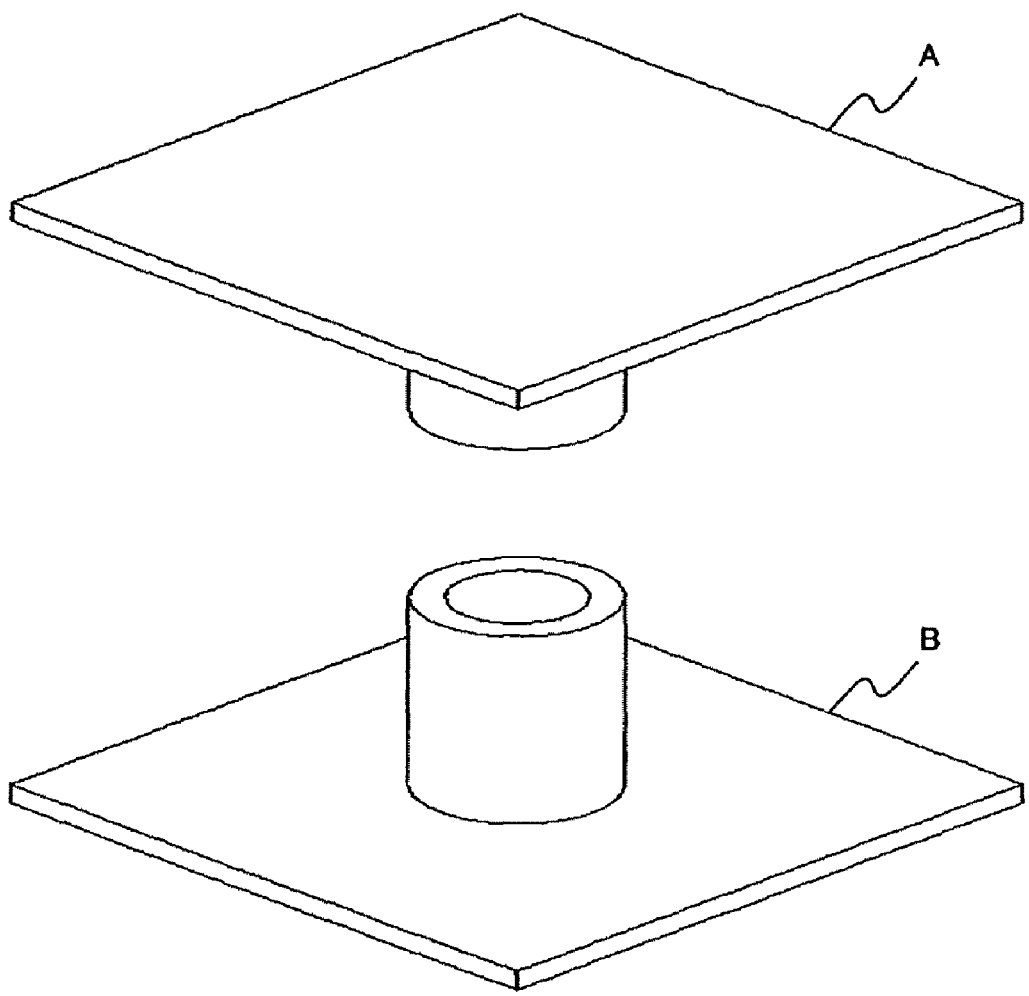
FIG. 20 is a diagram illustrating an example of three-dimensional design data representing two elements that are to be connected to each other.
Figure 21:
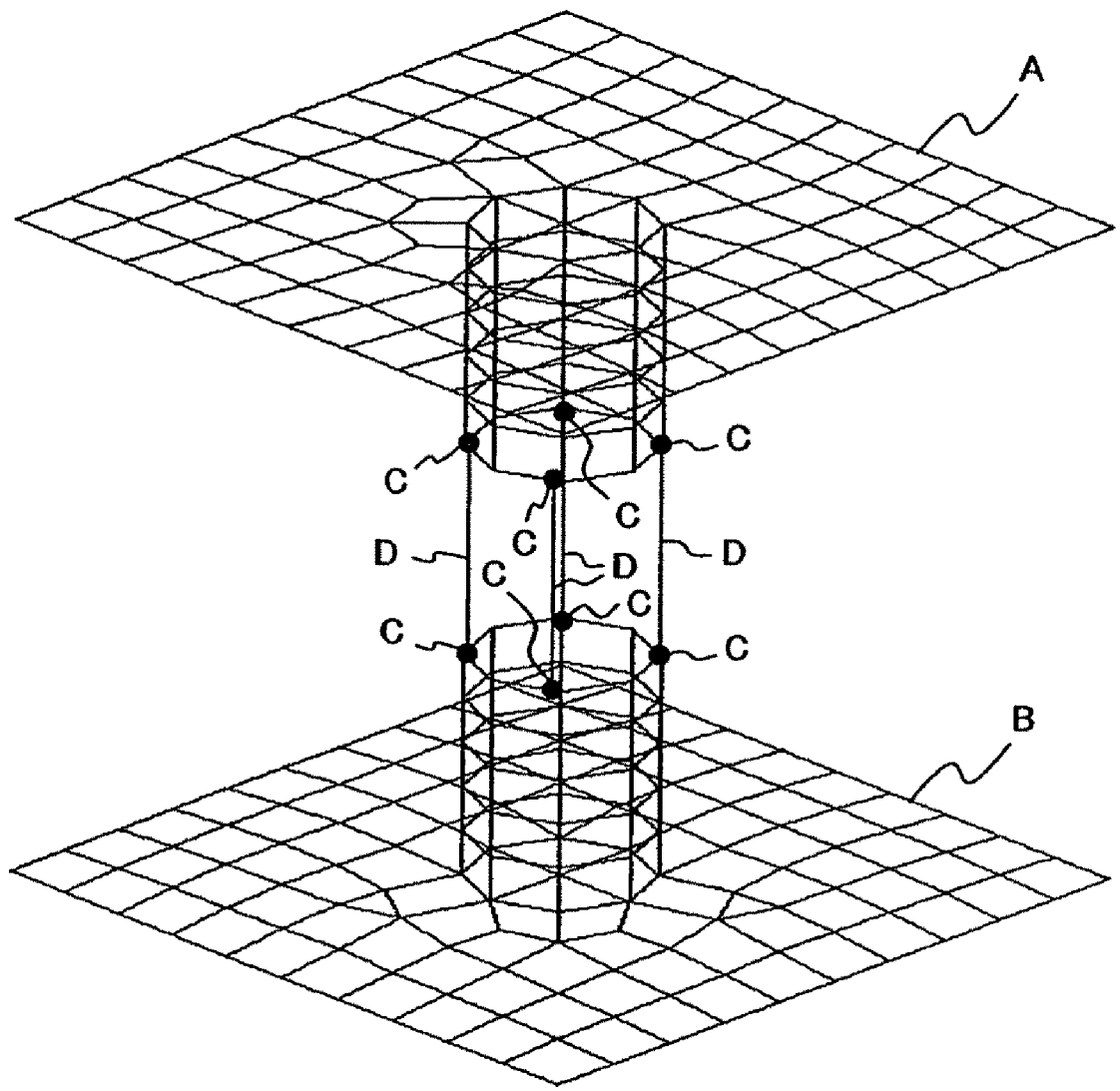
FIG. 21 is a diagram illustrating mesh data concerning three-dimensional design data of the two elements shown in FIG. 20.
Figure 22:
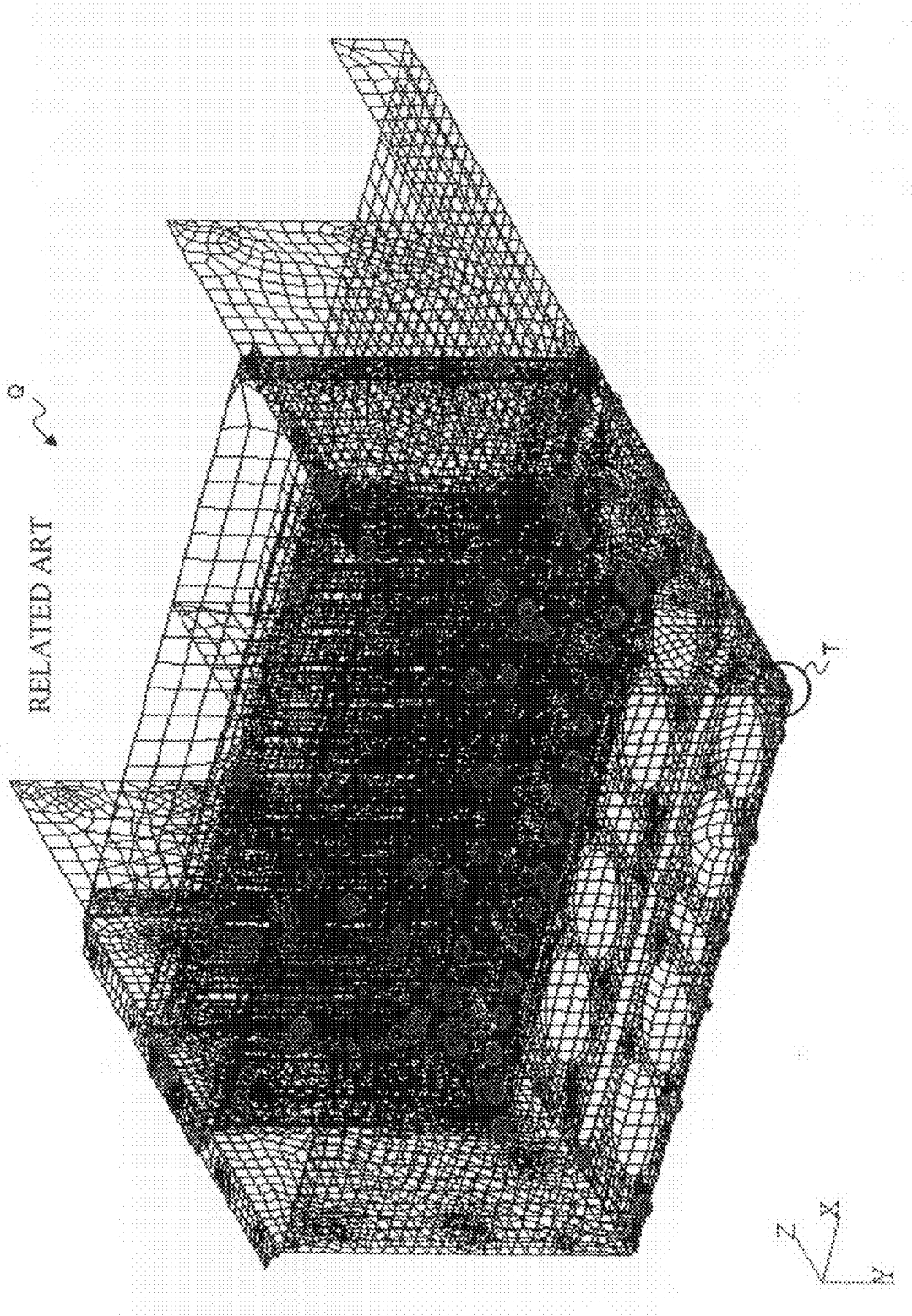
FIG. 22 is a diagram illustrating mesh data concerning a case for a server.
Figure 23A:
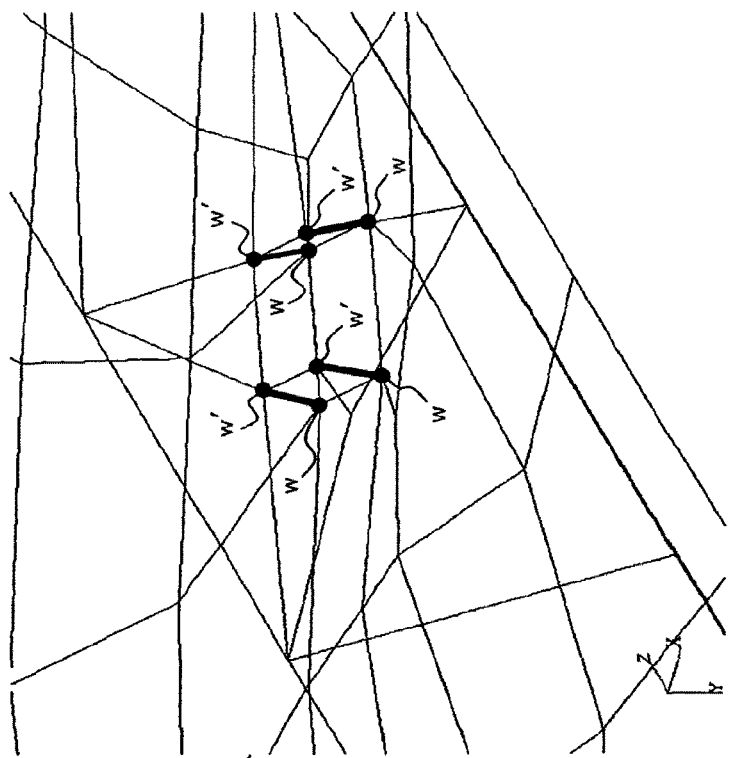
FIGS. 23(a), 23(b) and 23(c) are diagrams illustrating an enlargement view of a connection in the mesh data, shown in FIG. 22 at which connection two elements are connected, and more particularly
Figure 23B:
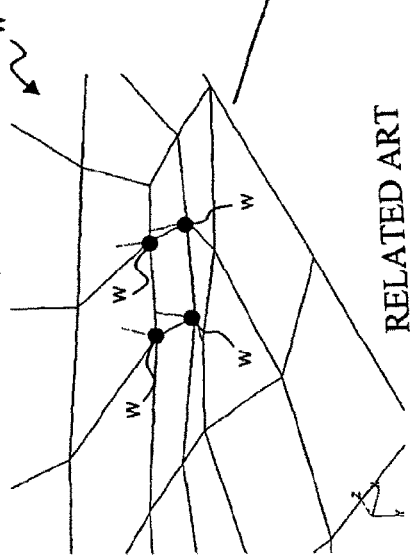
Figure 23C:
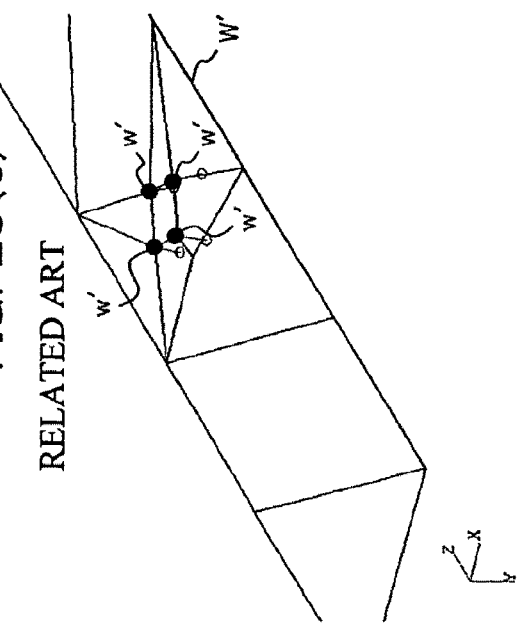

The mesh data generating section 12 generates mesh data in the above manner. Concerning a case P for a PC shown in FIG. 17, the mesh data generating section 12 generates mesh data as shown in FIG. 18.

The mesh data generating section 12 generates mesh data represented by a polygon having eight or more nodes for each edge corresponding to a connection at which two elements are connected when the object is formed partly because, if an element of an object is connected to two different elements at the connection, structural analysis obtains a preferable accurate result by using four node connections between nodes on the element in question and those of each of the different elements which connections are made by the MPC connecting section 14, and partly because it is not preferable that a single node is connected to a number of nodes, corresponding to one to each of a number of elements. For this reason, at least eight nodes are required for a single element when the element is connected to two different elements at the same connection.

The node extracting section 13 extracts, from mesh data generated by the mesh data generating section 12, nodes corresponding to a pair of edges extracted by the edge extracting section 11 on the basis of edge data concerning position, shape, direction and another factor of the pair of edges which data has been extracted by the edge extracting section 11 and stored in the edge data retaining section 11a.

In particular, the node extracting section 13 put the edge data shown in FIG. 3 on the mesh data and extracts nodes corresponding to the pair of edges.

At that time, the node extracting section 13 extracts each node from a predetermined range on the mash data based on the edge data. In other words, each node corresponding to an edge of the edge pair is extracted from a predetermined area even if the position and the shape of the node on the mash data are not precisely identical to those on the edge data. Even when conversion from the 3D design data to mesh data leads to an error, it is possible to absorb the error and to ensure extraction of nodes corresponding to a pair of edges from mesh data.

Therefore the mesh data generating section 12 generates mesh data represented by a polygon having eight or more nodes for each of a pair of edges, and the node extracting section 13 extracts the eight or more nodes for each edge.

For example, from the mesh data concerning the elements a and b shown in FIG. 4, the node extracting section 13 extracts 16 nodes d on the element a and 20 nodes e on the element b correspondingly to nodes of the pair of edges.

The MPC connecting section 14 connects nodes concerning one of a pair of edges that are corresponding to a connection at which two elements are connected, which nodes have been extracted by the node extracting section 13, to nodes concerning to the other of the edge pair, which nodes have been extracted also by the node extracting section 13, in an MPC connection manner.

As mentioned above, an accurate structural analysis preferably requires mesh data having at least four node connections representing the connection between two elements which are to be connected to each other. For this reason, the MPC connecting section 14 makes MPC one-to-one connection on four or more nodes, each interposed by one or more nodes, of the eight nodes concerning each of the pair of edges which nodes have been extracted by the node extracting section 13. Nodes of one edge, each of which are interposed by at least one node, are connected to nodes of the other edge, each of which is also interposed by at least one node partly because two elements are connected to each other keeping good balance for an accurate structure analysis and partly because a structural analysis can apply to an object in which an element is connected to two different elements at the same connection (exemplified by the case shown in FIGS. 7(b), 8(b) and 10).

The connection pattern retaining section 15 retains connection patterns in relation to connections between a number of elements that unitedly form an object. For example, the connection pattern retaining section 15 retains various connection patterns in relation to connection manners between a number of elements (or a member serves as a part of an element) as shown in FIGS. 6(a), 6(b), 7(a), 7(b), 8(a) and 8(b). FIGS. 6(a), 7(a) and 8(a) on the left illustrate 3D design data and FIGS. 6(b), 7(b) and 8(b) on the right illustrate mesh data corresponding to the FIGS. 6(a), 7(a) and 8(a), respectively.

Figure 6B:
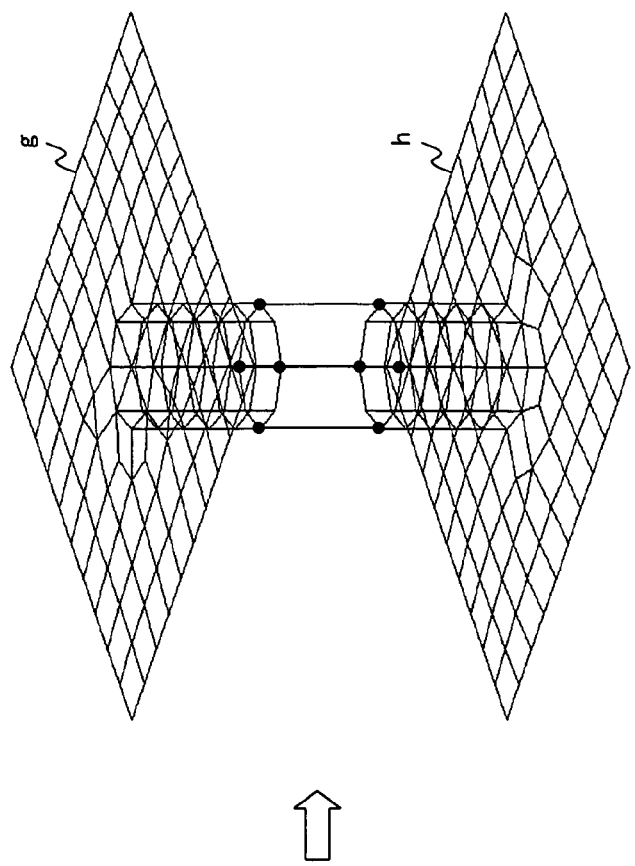
FIGS. 6(a) and 6(b) are diagrams illustrating an example of a connection pattern retained in a connection pattern retaining section of the apparatus of FIG. 1, and more particularly
Figure 6A:
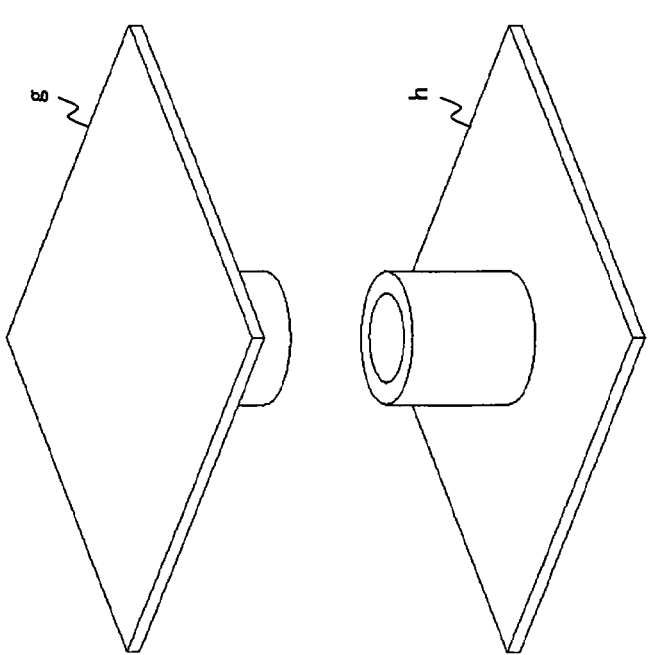
Figure 7B:
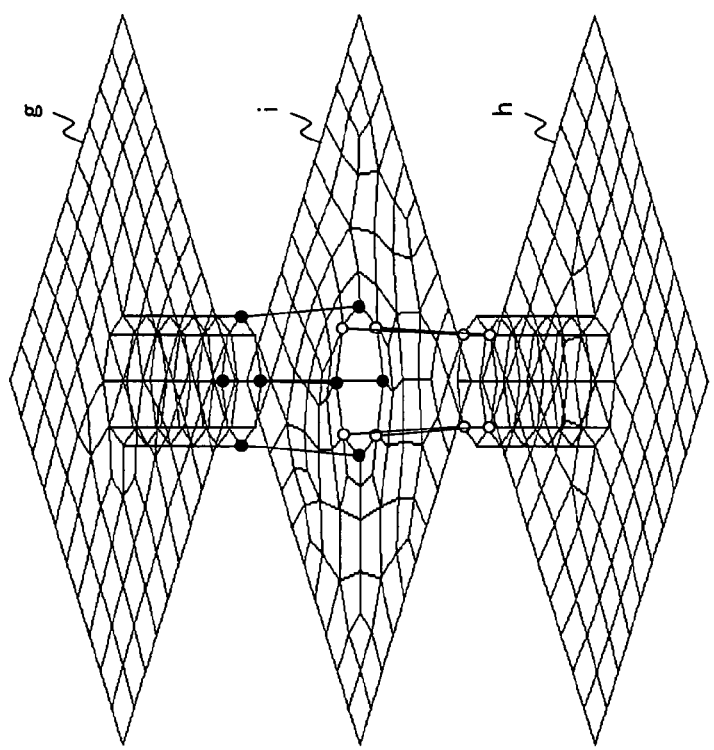
FIGS. 7(a) and 7(b) are diagrams illustrating an example of a connection pattern retained in a connection pattern retaining section of the apparatus of FIG. 1, and more particularly
Figure 7A:
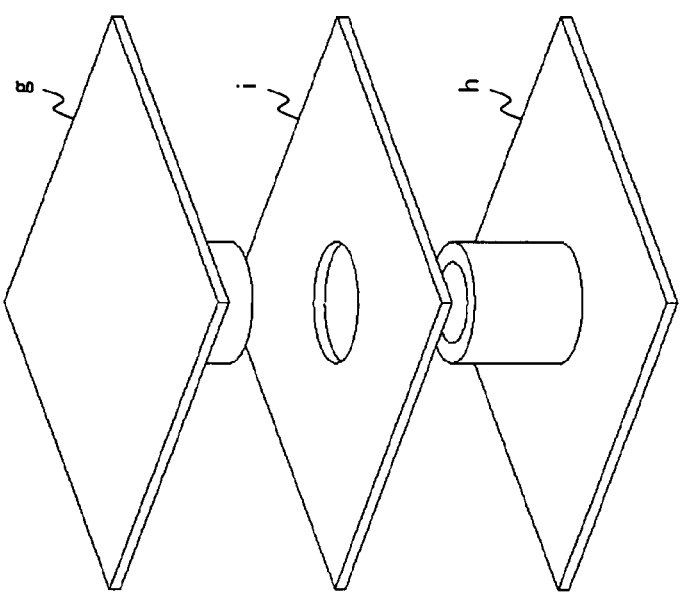

FIGS. 6(a) and 6(b) indicates a connection pattern that elements g and h, each having a boss, are connected to each other by a fastening screw (not shown); FIGS. 7(a) and 7(b), a connection pattern that three elements g, h and i, arranged in such an order that the elements g and h are interposed by the element i, are connected by a fastening screw (not shown); and FIGS. 8(a) and 8(b), a connection pattern that four elements g, h, i and j, arranged in such an order that the elements g and h are interposed by the elements i and j, are connected by a fastening screw (not shown). Each of a pair of edge included in two elements that are to be connected to each other is represented by a polygonal having eight or more nodes in mesh data in FIGS. 6(b), 7(b) and 8(b).

The MPC connecting section 14 finds a connecting pattern identical or substantially identical to a connection pattern between two elements of which nodes are connected to each other from the connection pattern retaining section 15, and connects, on the basis of the found connection pattern in the connection pattern retaining section 15 four or more of the nodes, which have been extracted by the node extracting section 13 and which are corresponding to an edge of one of the two elements that are to be connected to each other, to four or more nodes corresponding to the edge of the other element which nodes have been extracted by the node extracting section 13.

Connection patterns retained in the connection pattern retaining section 15 is explained in relation to those shown in FIGS. 6(*a*), 6(*b*), 7(*a*), 7(*b*), 8(*a*) and 8(*b*) but should by no means be limited to the above examples, of course. Connection patterns retained in the connection pattern retaining section 15 may be same in configuration as the above examples but may however be different in the number of nodes corresponding to each edge and/or in connection manner (alternatively, connecting by welding such as spot welding) from the above examples. As mentioned above, repletion of connection patterns serving as connection algorithms can cause the MPC connecting section 14 to MPC connect nodes rapidly and efficiently.

Figure 5:
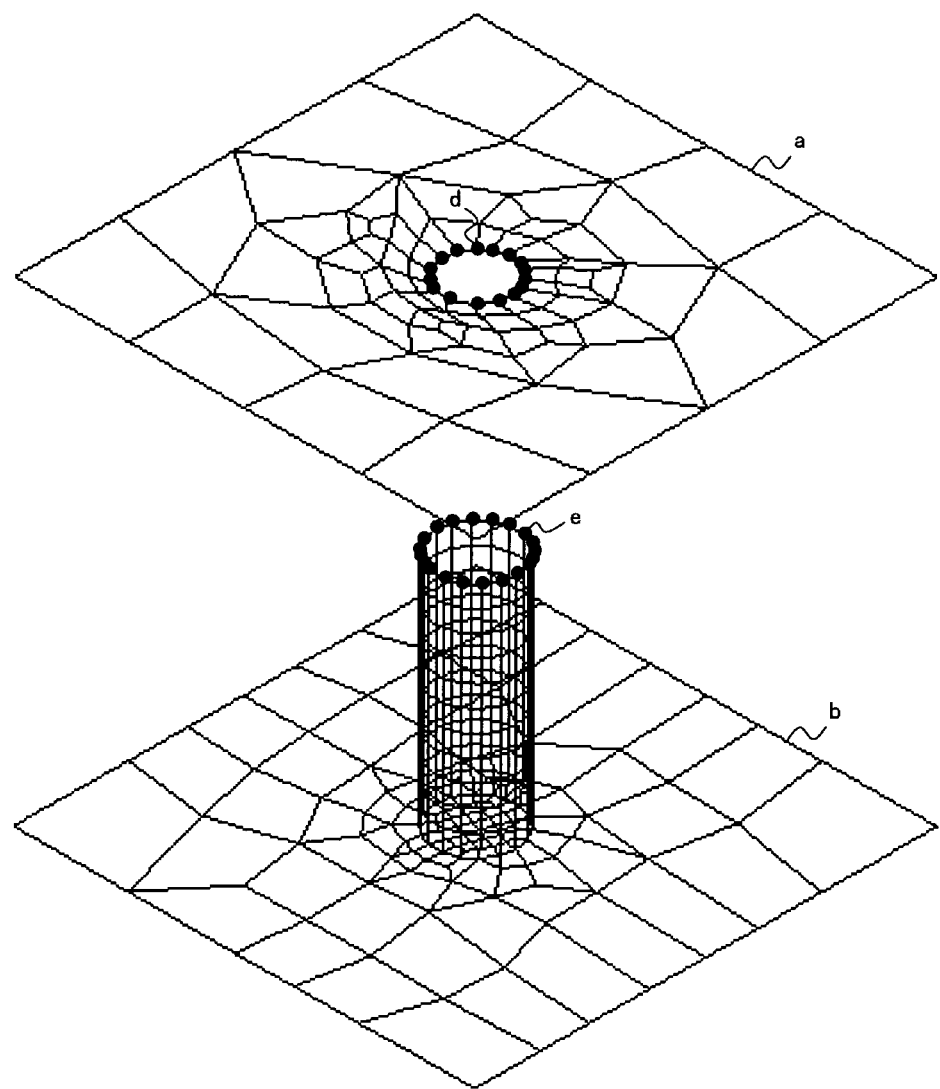
FIG. 5 is a diagram illustrating nodes extracted from the mesh data of FIG. 4 by a node extracting section of the apparatus of FIG. 1.
Figure 9:
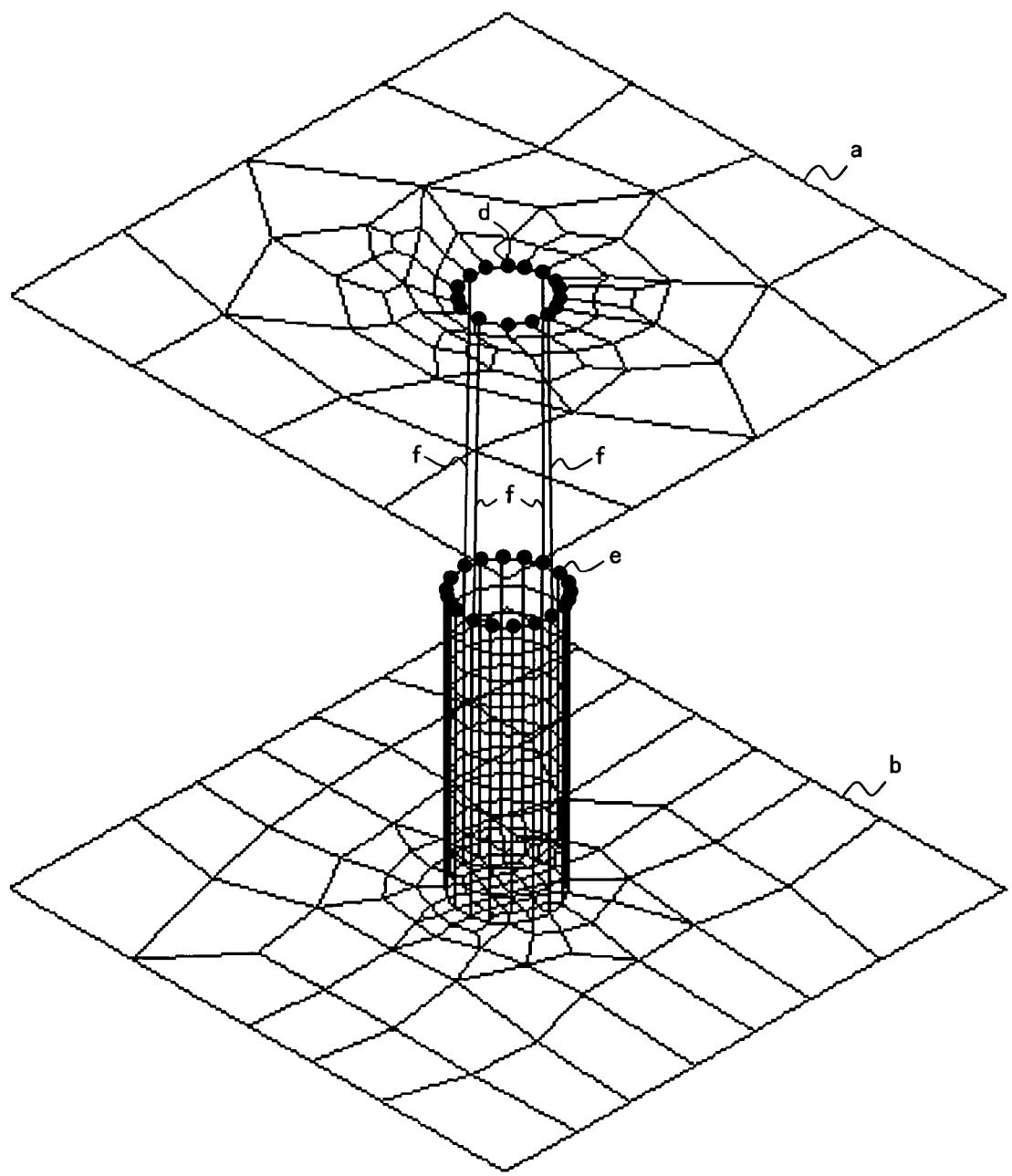
FIG. 9 is a diagram illustrating mesh data in which nodes shown in FIG. 5 are connected by an MPC connecting section of the apparatus of FIG. 1.

Description will now be made in relation to specific MPC connection carried out by the MPC connecting section 14. For example, when elements a and b, from which 16 nodes d and 20 nodes e are extracted respectively as shown in FIG. 5, are to be connected to each other, the MPC connecting section 14 connects, as shown in FIG. 9, four nodes d of the element a to four nodes e of the element b by lines f to form one-to-one connection whereby the elements a and b are connected in a manner of MPC connection.

Figure 10:
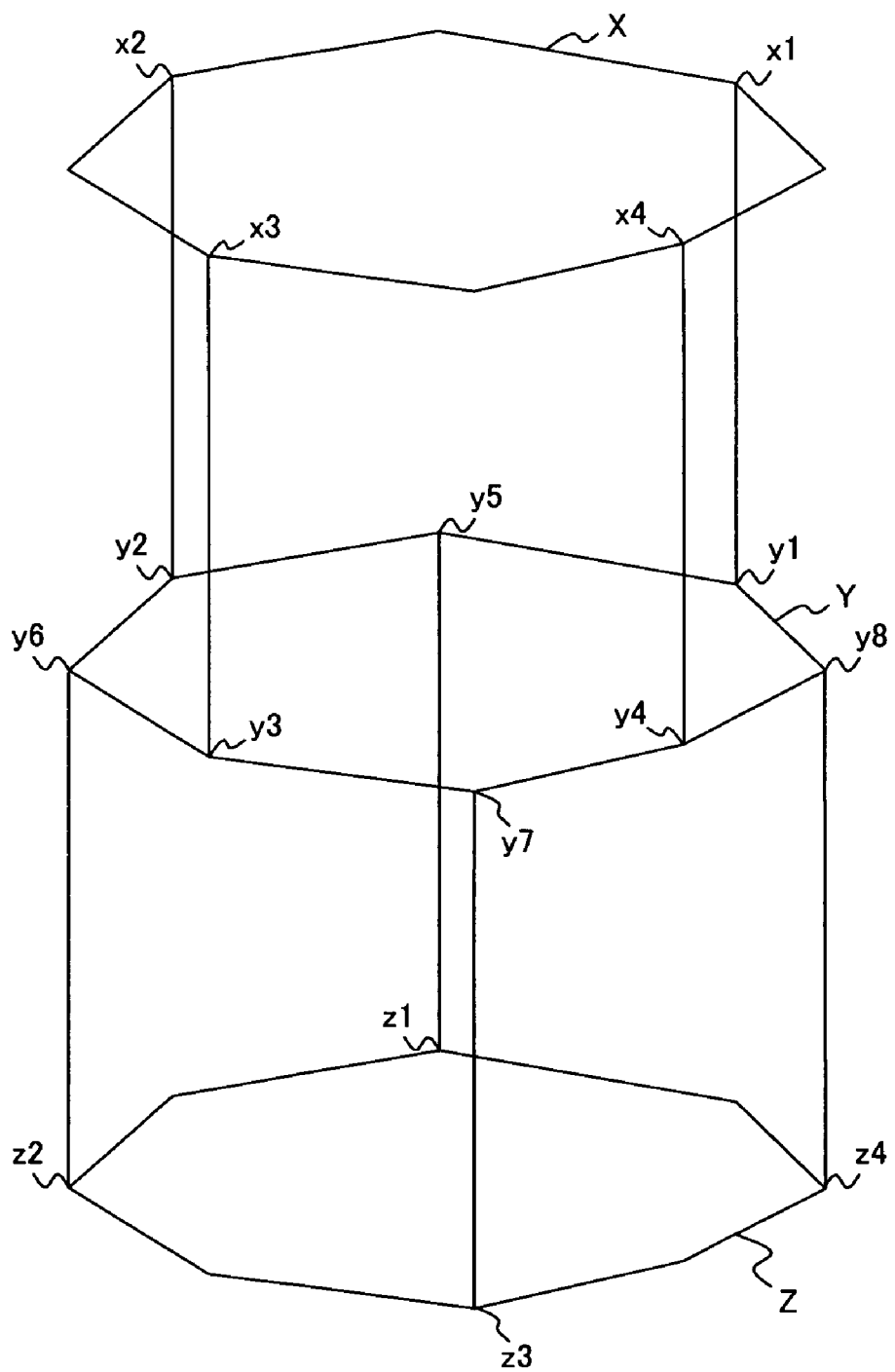
FIG. 10 is a diagram illustrating a connection manner carried out by the MPC connecting section.

Further, description is made in relation to MPC connection performed by the MPC connecting section 14 when an element is connected to two different elements at the same connection with reference to FIG. 10. For simplicity, FIG. 10 illustrates partial mesh data, concerning three elements, corresponding only to edges (nodes extracted by the node extracting section 13) X, Y and Z.

As shown in FIG. 10, the MPC connecting section 14 selects nodes y1, y2, y3 and y4, each interposed by one node, from eight nodes of the edge Y that is to be connected to two different elements and connects the nodes y1, y2, y3 and y4 to x1, x2, x3 and x4 of the edge X, respectively, in one-to-one correspondence, so that the edge Y is connected to the edge X. In the meanwhile, nodes y5, y6, y7 and y8, different from nodes associated with those of the edge X, are connected to nodes z1, z2, z3 and z4 of the edge Z, respectively, in one-to-one correspondence whereby the edge Y is connected to the edge Z.

The structural analyzing section 16 applies structural analysis by finite element method to the object using the mesh data in which nodes are connected by the MPC connecting section 14.

Figure 11:
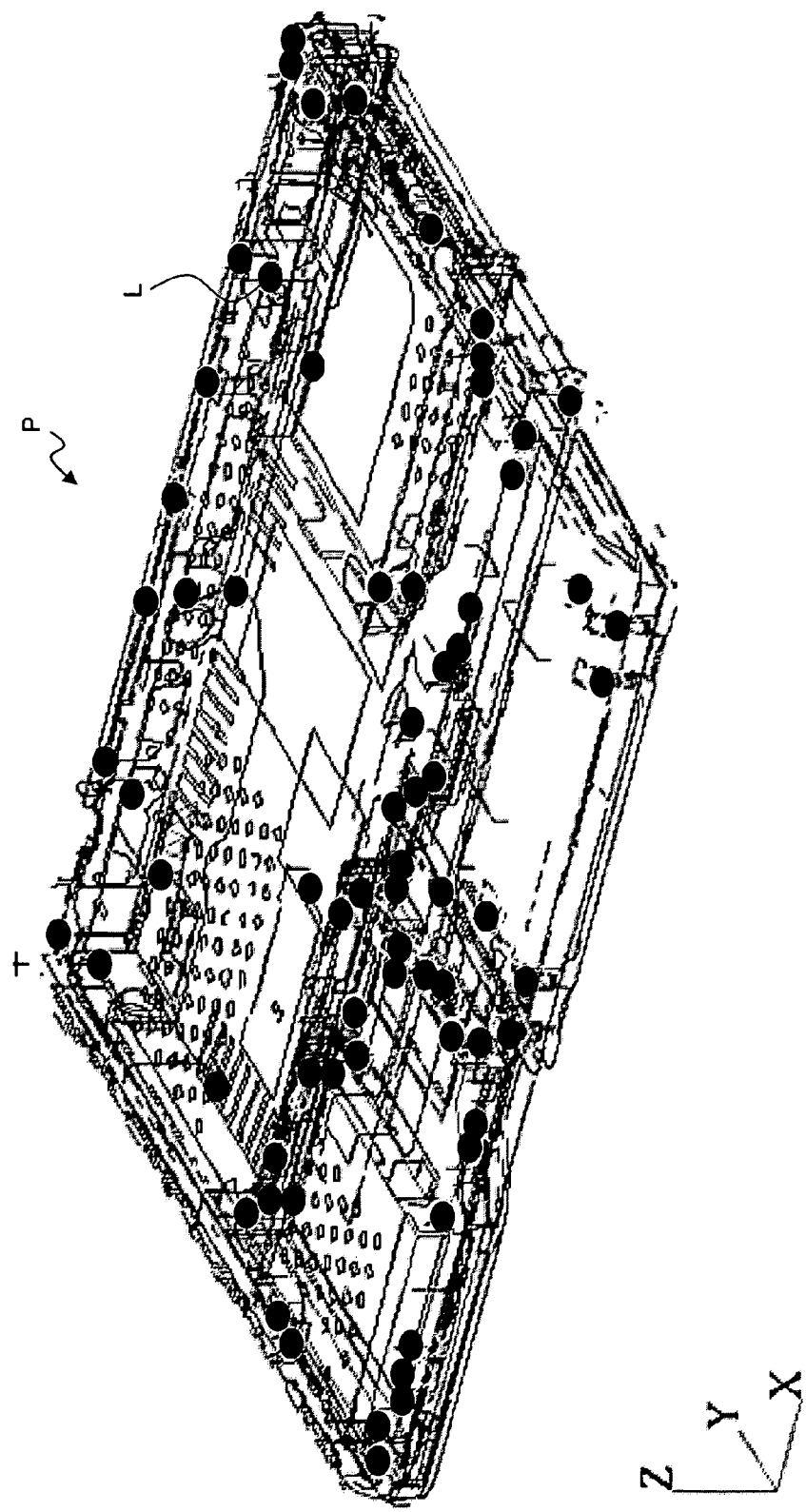
FIG. 11 is diagram illustrating an example of highlight in mesh data displayed on a monitor of the apparatus of FIG. 1.

The structural analysis apparatus 1 of the present invention further includes the monitor 17 serving as a displaying section and the display controlling section 18 for controlling display on the monitor 17. The display controlling section 18 emphasizes (highlights) a fastening screw and/or a welding portion when 3D design data is displayed on the monitor 17. Besides, the display controlling section 18 emphasizes pairs of edges (here, indicated by black circles), concerning the case P of a notebook PC, which edges have been extracted by the edge extracting section 11, as shown in FIG. 11, or emphasizes node extracted by the node extracting section 13 when corresponding mesh data is displayed on the monitor 17.

Figure 12:
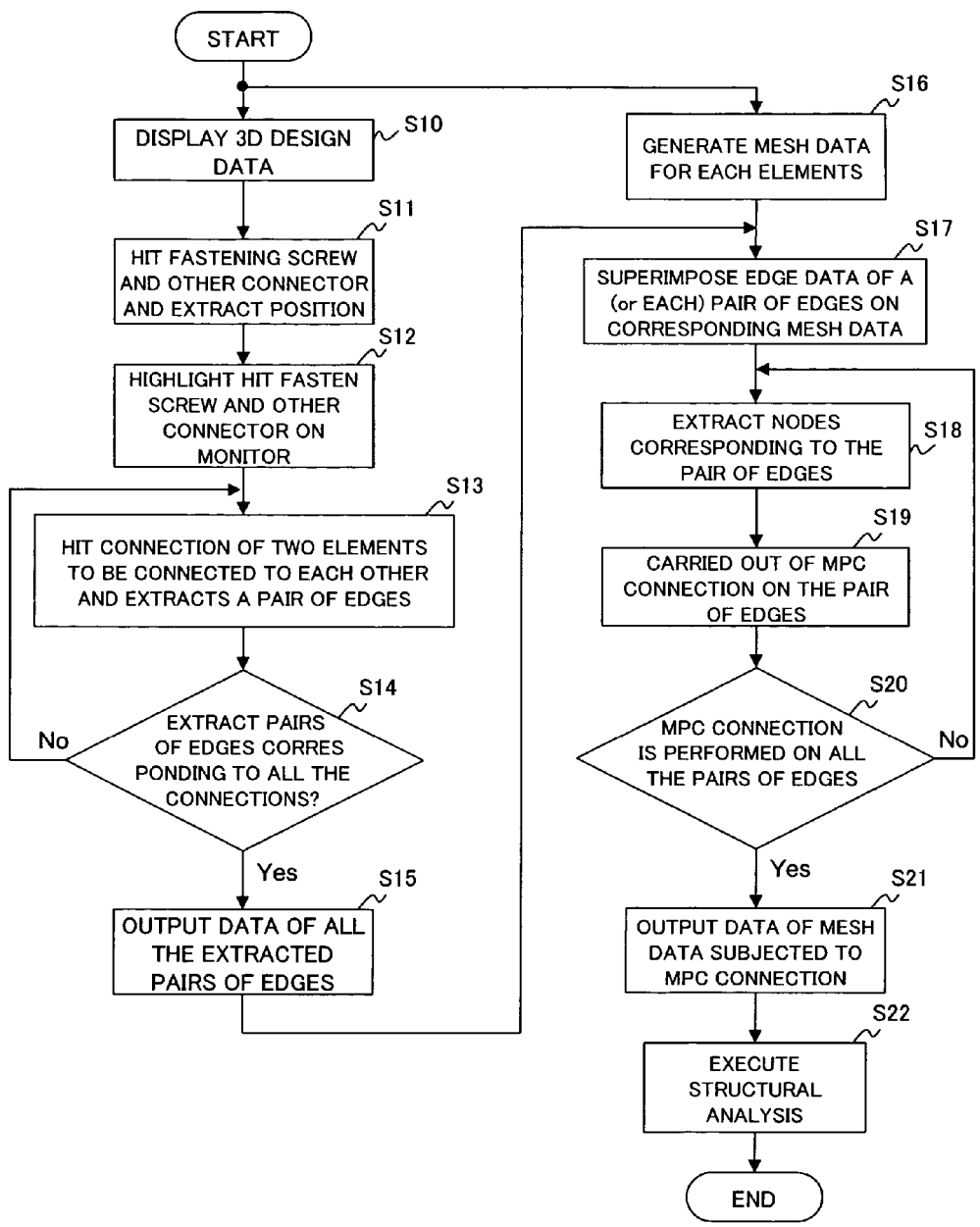
FIG. 12 is a flow diagram showing a succession of procedural steps of structural analyzing according to the first embodiment of the present invention.

Next, a succession of procedural steps (steps S10 to S22) of structural analysis (performed in the structural analysis apparatus 1) will now be described with reference to flow diagram FIG. 12. The procedural steps S10 to S21 of FIG. 12 includes generation of mesh data according to the present invention.

First of all, the display controlling section 18 displays 3D design data representing an object, which design data is retained in the 3D design data retaining section 10, on the monitor 17 (step S10), and the display controlling section 18 retrieves (hits) a position and/or a shape of a connector, such as a fastening screw, for connecting two or more elements in the 3D design data on the basis of the identification number of the connector which number is retained in the 3D design data (step S11). In succession, the display controlling section 18 emphasizes (highlights) the hit connector such as a fastening screw on the monitor 17 (step S12).

On the basis of connector data hit from the 3D design data based on the identification number, the edge extracting section 11 hits a connection at which two elements are connected to each other and extracts a pair of edges corresponding to the hit connection (step S13, edge extracting step).

Here, if pairs of edges corresponding to all the connections are extracted (yes route in step S14), the edge extracting section 11 stores edge data of all the extracted pair of edges into the edge data retaining section 11*a* (step S15). On the other hand, if pairs of edges corresponding to all the connections are not extracted yet (no route in step S14), step S13 is repeatedly carried out until pairs of edges corresponding to all the connections are extracted.

The mesh data generating section 12 generates mesh data for each of the elements unitedly forms the object on the basis of the 3D design data retained in the 3D design data retaining section 10 (step S16; mesh data generating step). The mesh data generating step (step S16) performed by the mesh data generating section 12 is enough to accomplish until execution of step S17 to be described later, and may therefore be carried out in parallel with the extraction of a pair of edges by the edge extracting section 11.

Next, the node extracting section 13 superimposes the edge data retained in the edge data retaining section 11*a* on the mesh data generated by the mesh data generating section 12 (step S17) and extracts nodes corresponding to the pair of edge from the mesh data (step S18, node extracting step).

Comparing with the corresponding connection patterns retained in the connection pattern retaining section 15, the MPC connecting section 14 connects nodes corresponding to one of the pair of edges, which nodes have been extracted by the node extracting section 13, to node corresponding to the other edge, which nodes have also been extracted by the node extracting section 13, in a manner of MPC connection (step S19; node connecting step).

Here, when MPC connection has not been performed on nodes corresponding to all the pairs of edges of elements that are to be connected when the object is formed (No route in step S20), the above steps S18 and S19 are repeatedly performed. Conversely, when the entire nodes that are corresponding to all the pair of edges of elements are connected in a manner of MPC connection (yes route in step S20), the MPC connecting section 14 sends the structural analyzing section 16 information of the mesh data in which MPC connection has been performed between the elements to be connected to each other (step S21). In succession, the structural analyzing section 16 applies finite element method for structural analysis to the object using the mesh data in which nodes are connected by the MPC connecting section 14 (step S22; structural analysis step) and the procedural steps are completed.

Figure 13:
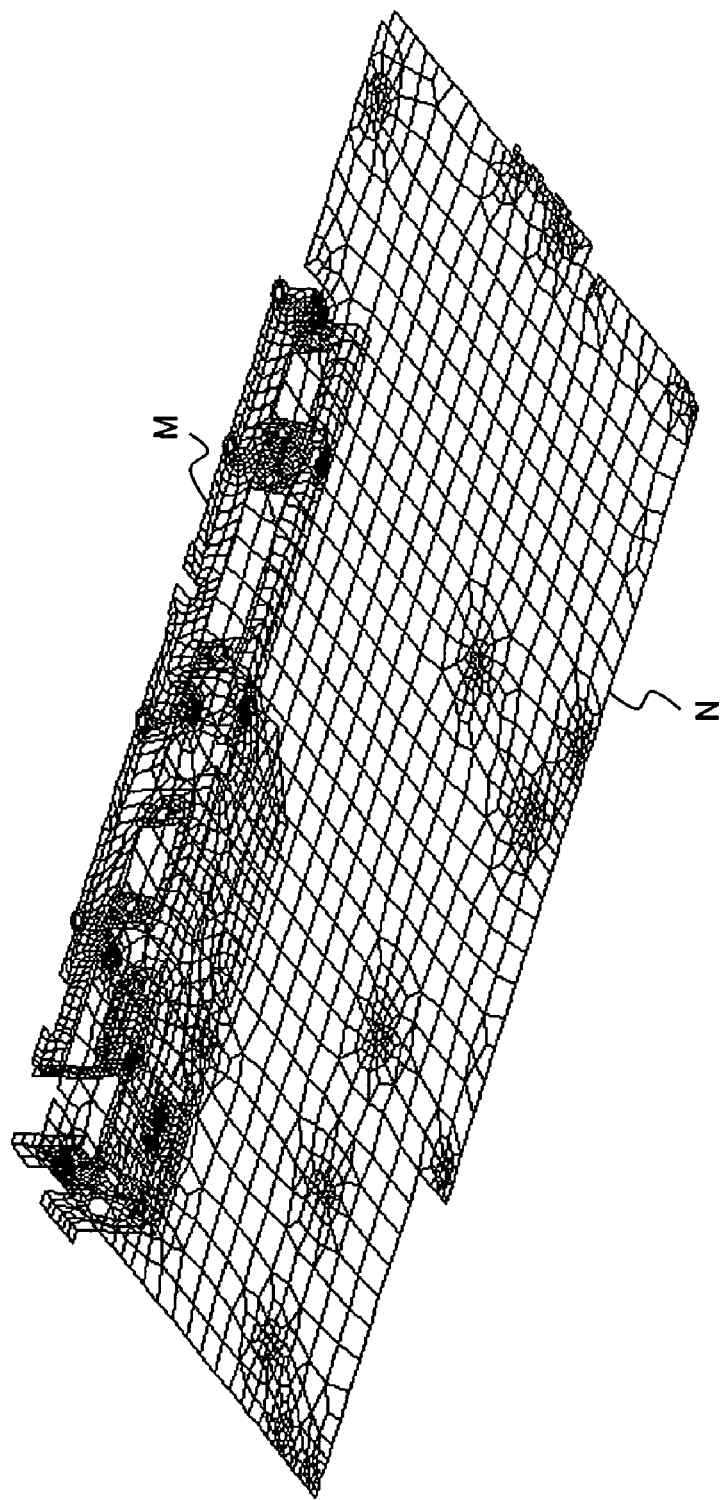
FIG. 13 is a diagram illustrating an example of mesh data generated by the mesh data generating section.
Figure 14A:
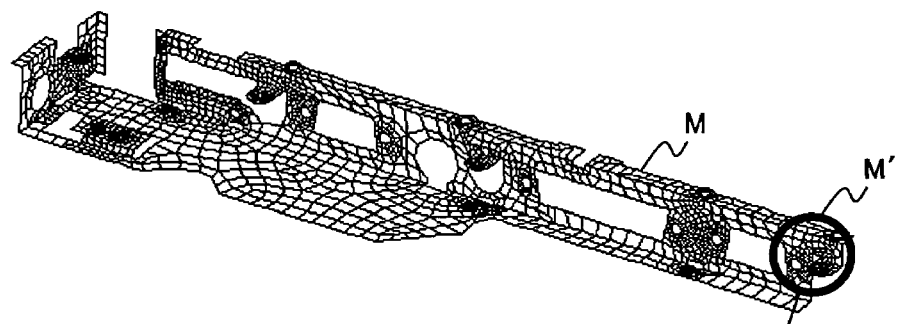
FIGS. 14(a) and 14(b) are illustrates mash data concerning one of two elements that are to be connected to each other shown in FIG. 13, and more particularly FIG. 14 (a) illustrates the entire element and FIG. 14 (b) illustrates an enlarged view of the connection of the element.
Figure 14B:
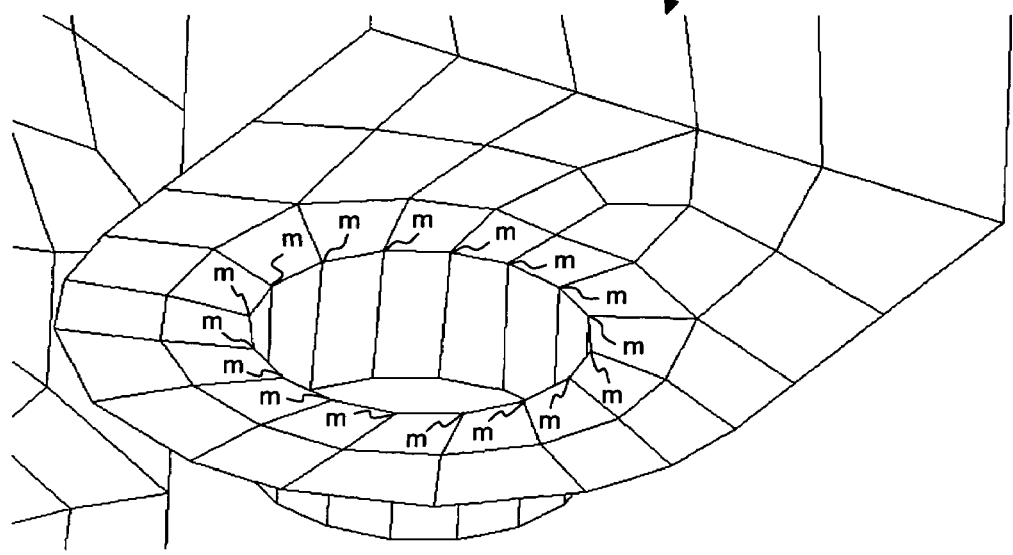
Figure 15A:
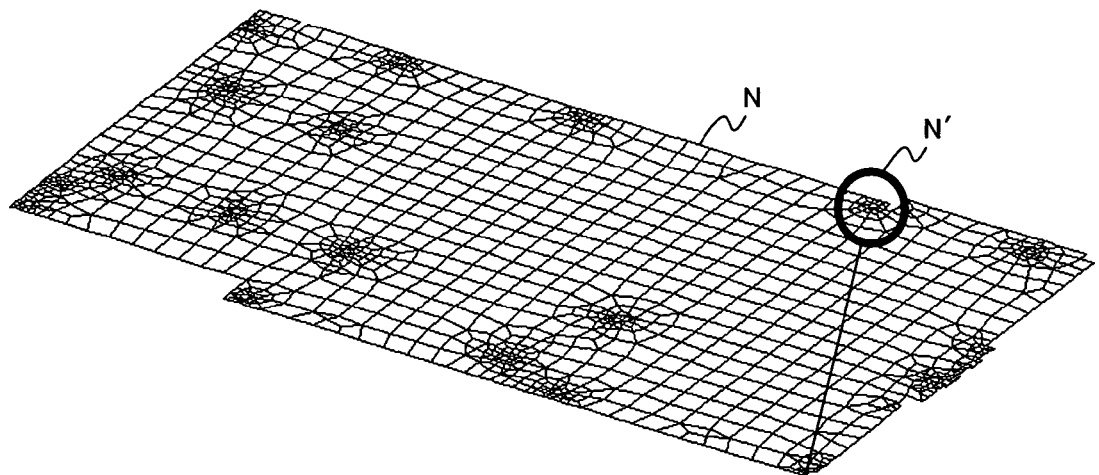
FIGS. 15(a) and 15(b) are illustrates mash data concerning the other of the two elements that are to be connected to each other shown in FIG. 13, and more particularly
Figure 15B:
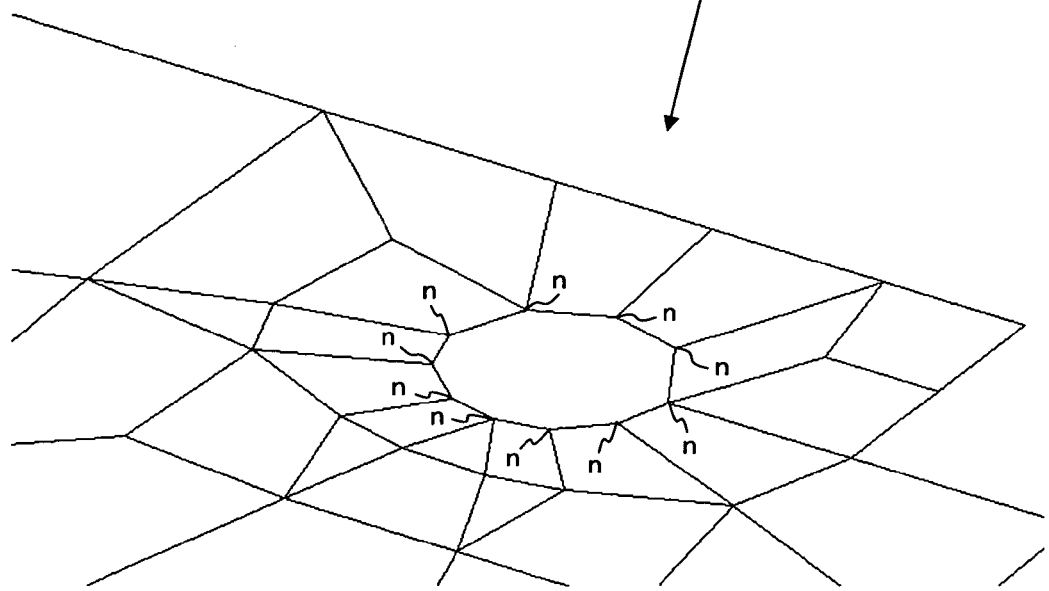

As mentioned above, in the structural analysis apparatus 1 and the method for structural analysis according to the first embodiment of the present invention, if elements M and N are, as shown by the mesh data in FIG. 13, connected to each other at a pair of edges L shown in FIG. 11, which are included in the case P of the notebook PC, which have been extracted by the edge extracting section 11 and which are highlighted by the display controlling section 18, the node extracting section 13 extracts 16 nodes m corresponding to one edge on the element M as shown in FIGS. 14(*a*) and 14(*b*) and extracts 10 nodes n corresponding to the other edge on the element N as shown in FIGS. 15(a) and 15(b) (node extracting step). FIGS. 14(b) and 15(b) are enlargements of an edge part M' in FIG. 14(a) and an edge N' in FIG. 15(a), respectively.

Figure 16:
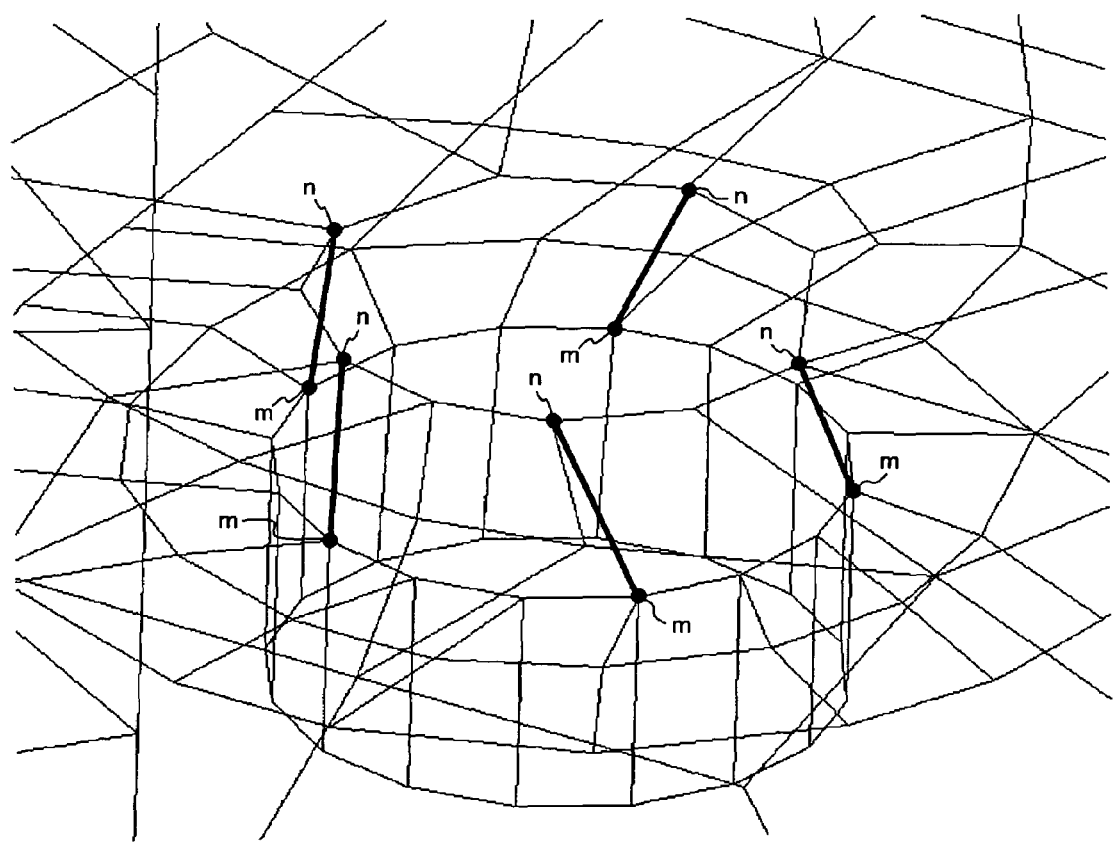
FIG. 16 is a diagram illustrating mesh data in which nodes shown in FIG. 14 are connected to those shown in FIG. 15 by the MPC connecting section of the apparatus of FIG. 1.

Then, as shown in FIG. 16, the MPC connecting section 14 connects four or more (here, five) of the nodes of the element M to four or more (here, five) of the nodes of the element N in a manner of one-to-one MPC connection (node connecting step).

As a result, structural analysis apparatus 1 and the method for structural analysis according to the first embodiment of the present invention can automatically connect mesh data concerning one of two elements that are to be connected each other to mesh data of the other element, requiring no manual operation by an operator, so that mesh data used for application of structural analysis to an object formed by a plurality of elements are connected can be generated. That requires approximately one-twentieth length of time required for manual operation to generate mesh data and greatly promotes efficiency in generation of mesh data.

(2) Others

The present invention should by no means be limited to this foregoing embodiment, and various changes or modifications may be suggested without departing from the gist of the invention.

For example, the structural analysis apparatus 1 includes the monitor 17 and the display controlling section 18 but alternatively, may omit the monitor 17 and the display controlling section 18.

Further, in the first embodiment, the structural analyzing section 16 performs finite element method for structural analysis. Alternatively, any structural method can be applied as long as that uses mesh data.

In the first embodiment, two elements are connected to each other by a screw (a fastening screw) to which should by no means limited. Two elements may be connected by means of spot welding or other method that can identify each connection, at which two elements are connected, in the 3D design data with reference to identification number so that the edge extracting section can extract a pair of edge of the connection.

In the above description, the object for structural analysis takes the form of cases of a PC and a server, but should by no means be limited to these examples. The present invention can apply to any object formed by a plurality of elements.

Still further, edge data about a pair of edges which data has been extracted by the edge extracting section 11 is stored in the edge data retaining section 11a in the first embodiment. But, the present invention should by no means be limited to this. Alternatively, the edge extracting section 11 may extract a pair of edge and send edge data concerning the pair of edge directly to the node extracting section 13.

The functions of the edge extracting section 11, the mesh data generating section 12, the node extracting section 13, the MPC connecting section 14, the structural analyzing section 16 and the display controlling section 18 may be realized by a computer (including a CPU, an information processing apparatus, and/or various terminals) executing a certain program (a structural analysis program or a mesh data generating program).

Such a program are provided in the form stored in a computer-readable recoding medium exemplified by a flexible disk, a CD (CD-ROM, CD-R, CD-RW or the like), a DVD (DVD-ROM, DVD-RAM, DVD-R, DVE-RW, DVD+R, DVD+RW or the like). In this case, a computer reads the structural analysis program or the mesh data generating program from a recording medium and sends the read program to an internal or external memory to store the program for use. Alternatively, such a program is recorded in a memory (a recording medium) such as a magnetic disk, an optical disk or a magneto-optical disk and is provided to a computer from the memory through a communication line.

The concept of a computer here includes hardware and an OS (operating system) and means hardware that operates under control of the OS. If an application program independently operates hardware, requiring no OS, the hardware itself corresponds to a computer. Hardware includes at least a microprocessor such as a CPU and means for reading a computer program stored in a recording medium.

An application program serving as the above structural analysis program includes a program code which instructs a computer of a kind above described to function as the edge extracting section 11, the mesh data generating section 12, the node extracting section 13, the MPC connecting section 14, the structural analyzing section 16, and the display controlling section 18. The part of the function may be realized by an OS, not by the application program.

Further, an application program serving as the above mesh data generating program includes a program code which instructs a computer of a kind above described to function as the edge extracting section 11, the mesh data generating section 12, the node extracting section 13, the MPC connecting section 14, and the display controlling section 18. The part of the function may be realized by an OS, not by the application program.

The recording medium used in the present invention may be one from various computer-readable recording medium in the form of an IC card, a ROM cartridge, a magnetic tape, a punch card, an internal memory (such as a RAM or a ROM) in a computer, an external memory, or a printed matter on which codes such as bar codes are printed, other than the above examples of a flexible disk, a CD, a DVD, a magnetic disk, an optical disk or a magneto-optical disk.

What is claimed is:

1. An apparatus for generating mesh data comprising:
   a three-dimensional design data retaining section for retaining three-dimensional design data representing a structure of an object formed by uniting a plurality of elements;
   an edge extracting section for extracting, on the basis of information to discriminate a connector in the three-dimensional design data retained in said three-dimensional design data retaining section, a pair of edges which are included in two of the plural elements and which are corresponding to a connection at which the two elements are connected to each other by the connector when the object is formed;
   a mesh data generating section for generating, on the basis of the three-dimensional design data, mesh data concerning each of the plural elements except for the connector which mesh data is used for application structural analysis to the object;
   a node extracting section for extracting nodes corresponding one to each of the pair of edges extracted by said edge extracting section from the mesh data generated by said mesh data generating section; and
   a node connecting section for connecting the nodes of the pair of edges to each other, which nodes are extracted by said node extracting sections
   wherein, if each of two of the plural elements has a threaded hole and the two or more elements are connected by a screw inserted into the threaded holes, said edge extracting section extracts edges of the threaded holes, serving as the connection, as edges of the two or more elements.

2. An apparatus for generating mesh data according to claim 1, wherein:
said edge extracting section extracts positions and shapes of the pair of edges on the two elements; and
said node extracting section extracts the nodes on the basis of the positions and the shapes of the pair of edges.

3. An apparatus for generating mesh data according to claim 1, wherein said node connecting section connects the nodes in a manner of MPC (Multi Point Constraint) connection.

4. An apparatus for generating mesh data according to claim 1, further comprising a connection pattern retaining section for retaining connection patterns in relation to connections between the plural elements,
wherein said node connecting section connects the nodes in conformity to the connection patterns retained in said connection pattern retaining section.

5. An apparatus for generating mesh data according to claim 1, wherein:
said mesh data generating section generates the mesh data such that each of the pair of edges, which are corresponding to the connection, is represented by a polygon including eight or more of the nodes; and
said node extracting section extracts the eight or more nodes representing each of the pair of edges, serving as the first-named nodes one corresponding to each of the pair of edges.

6. An apparatus for generating mesh data according to claim 5, wherein said node connecting section connects at least four nodes, each interposed by one or more nodes, of the eight or more nodes which are extracted by said node extracting section and which correspond to one of the pair of edges to at least four nodes, each interposed by one or more nodes, of the eight or more nodes corresponding to the other of the pair of edges.

7. A computer-readable recording medium in which a program for generating mesh data of a structure of an object formed by uniting a plurality of elements is stored, wherein said program instructs a computer to function as:
an edge extracting section for extracting, on the basis of information to discriminate a connector in the three-dimensional design data representing the structure of the object, a pair of edges which are included in two of the plural elements and which are corresponding to a connection at which the two elements are connected to each other by the connector when the object is formed;
a mesh data generating section for generating, on the basis of the three-dimensional design data, mesh data concerning each of the plural elements except for the connector which mesh data is used for application structural analysis to the object;
a node extracting section for extracting nodes corresponding each to one of the pair of edges extracted by said edge extracting section from the mesh data generated by said mesh data generating section; and
a node connecting section for connecting the nodes of the pair of edges to each other, which nodes are extracted by said node extracting sections
wherein said program for generating mesh data instructs the computer to cause said edge extracting section to extract, if each of two of the plural elements has a threaded hole and the two or more elements are connected by a screw inserted into the threaded holes, edges of the threaded holes as edges of the two or more elements.

8. A computer-readable recording medium according to claim 7, wherein said program for generating mesh data instructs the computer to causes:
said edge extracting section to extract positions and shapes of the pair of edges on the two elements; and
said node extracting section to extract the nodes on the basis of the positions and the shapes of the pair of edges.

9. A computer-readable recording medium according to claim 7, wherein said program for generating mesh data instructs the computer to cause said node connecting section to connect the nodes in a manner of MPC (Multi Point Constraint) connection.

10. A computer-readable recording medium according to claim 7, wherein said program for generating mesh data instructs the computer to cause said node connecting section to connect the nodes in conformity to connection patterns in relation to connections between said plural elements.

11. A computer-readable recording medium according to claim 7, wherein said program for generating mesh data instructs the computer to causes:
said mesh data generating section to generate the mesh data such that each of the pair of edge is represented by a polygon including eight or more of the nodes; and
said node extracting section to extract the eight or more nodes representing each of the pair of edges, serving as the first-named node one corresponding to the pair of edges.

12. A computer-readable recording medium according to claim 11, wherein said program for generating mesh data instructs the computer to cause said node connecting section to connect at least four nodes, each interposed by one or more nodes, of the eight or more nodes which are extracted by said node extracting section and which correspond to one of the pair of edges to at least four nodes, each interposed by one or more nodes, of the eight or more nodes corresponding to the other of the pair of edges.

13. A method for generating mesh data comprising the steps of:
(a) extracting, on the basis of information to discriminate a connector in the three-dimensional design data representing a structure of an object formed by uniting a plurality of elements which design data is stored in a memory, a pair of edges which are included in two of the plural elements and which are corresponding to a connection at which the two elements are connected to each other by the connector when the object is formed;
(b) generating, on the basis of the three-dimensional design data, mesh data concerning each of the plural elements except for the connector which mesh data is used for application structural analysis to the object;
(c) extracting nodes corresponding one to each of the pair of edges extracted in said step (a) of extracting the pair of edges from the mesh data generated in said step (b) of generating the mesh data; and
(d) connecting the nodes of the pair of edges to each other, which nodes are extracted in said step (c) extracting the nodes,
wherein, if each of two of the plural elements has a threaded hole and the two or more elements are connected by a screw inserted into the threaded holes, said edge extracting section extracts edges of the threaded holes, serving as the connection, as edges of the two or more elements.

14. An apparatus for analyzing a structure of an object formed by uniting a plurality of elements comprising:
- a three-dimensional design data retaining section for retaining three-dimensional design data representing the structure of the object;
- an edge extracting section for extracting, on the basis of information to discriminate a connector in the three-dimensional design data retained in said three-dimensional design data retaining section, a pair of edges which are included in two of the plural elements and which are corresponding to a connection at which the two elements are connected to each other by the connector when the object is formed;
- a mesh data generating section for generating, on the basis of the three-dimensional design data, mesh data concerning each of the plural elements except for the connector;
- a node extracting section for extracting nodes corresponding one to each of the pair of edges extracted by said edge extracting section from the mesh data generated by said mesh data generating section; and
- a node connecting section for connecting the nodes of the pair of edges to each other, which nodes are extracted by said node extracting section; and
- a structure analyzing section for applying structural analysis to the object using the mesh data in which the nodes are connected,
- wherein, if each of two of the plural elements has a threaded hole and the two or more elements are connected by a screw inserted into the threaded holes, said edge extracting section extracts edges of the threaded holes, serving as the connection, as edges of the two or more elements.

15. A computer-readable recording medium in which a program for generating mesh data of a structure of an object formed by uniting a plurality of elements and for applying structural analysis to the object is stored, wherein said program instructs a computer to function as:
- an edge extracting section for extracting, on the basis of information to discriminate a connector in the three-dimensional design data of the structure of the object, a pair of edges which are included in two of the plural elements and which are corresponding to a connection at which the two elements are connected to each other by the connector when the object is formed;
- a mesh data generating section for generating, on the basis of the three-dimensional design data, mesh data concerning each of the plural elements except for the connector;
- a node extracting section for extracting nodes corresponding one to each of the pair of edges extracted by said edge extracting section from the mesh data generated by said mesh data generating section;
- a node connecting section for connecting the nodes of the pair of edges to each other, which nodes are extracted by said node extracting section; and
- a structure analyzing section for applying structural analysis to the object using the mesh data in which the nodes are connected,
- wherein said program for generating mesh data instructs the computer to cause said edge extracting section to extract, if each of two of the plural elements has a threaded hole and the two or more elements are connected by a screw inserted into the threaded holes, edges of the threaded holes as edges of the two or more elements.

16. A method for analyzing a structure of an object formed by uniting a plurality of elements comprising the steps of:
- (a) extracting, on the basis of information to discriminate a connector in the three-dimensional design data representing the structure of the object which design data is stored in a memory, a pair of edges which are included in two of the plural elements and which are corresponding to a connection at which the two elements are connected to each other by the connector when the object is formed;
- (b) generating, on the basis of the three-dimensional design data, mesh data concerning each of the plural elements except for the connector;
- (c) extracting nodes corresponding one to each of the pair of edges extracted in said step (a) of extracting the edge from the mesh data generated in said step (b) of generating the mesh data; and
- (d) connecting the nodes of the pair of edges to each other, which nodes are extracted in said step (c) of extracting the nodes; and
- (e) applying structural analysis to the object using the mesh data in which the nodes are connected in said step (d) of connecting,
- wherein, if each of two of the plural elements has a threaded hole and the two or more elements are connected by a screw inserted into the threaded holes, said edge extracting section extracts edges of the threaded holes, serving as the connection, as edges of the two or more elements.

* * * * *